United States Patent
Giaretta et al.

(10) Patent No.: US 8,774,128 B2
(45) Date of Patent: Jul. 8, 2014

(54) METHOD AND APPARATUS FOR DETACHMENT FROM A WIRELESS COMMUNICATION NETWORK

(75) Inventors: Gerardo Giaretta, San Diego, CA (US); Patrick Stupar, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 317 days.

(21) Appl. No.: 13/089,195

(22) Filed: Apr. 18, 2011

(65) Prior Publication Data

US 2012/0099560 A1    Apr. 26, 2012

Related U.S. Application Data

(60) Provisional application No. 61/325,758, filed on Apr. 19, 2010.

(51) Int. Cl.
*H04W 4/00* (2009.01)

(52) U.S. Cl.
USPC .......................... 370/331; 455/436

(58) Field of Classification Search
USPC .......................... 370/331; 455/436
See application file for complete search history.

(56) References Cited

U.S. PATENT DOCUMENTS

| | | | |
|---|---|---|---|
| 2003/0114158 A1* | 6/2003 | Soderbacka et al. | 455/436 |
| 2006/0104262 A1 | 5/2006 | Kant et al. | |
| 2006/0258356 A1* | 11/2006 | Maxwell et al. | 455/436 |
| 2010/0124198 A1* | 5/2010 | Wong | 370/329 |
| 2010/0322106 A1* | 12/2010 | Qiang | 370/254 |

FOREIGN PATENT DOCUMENTS

| | | |
|---|---|---|
| JP | H10164644 A | 6/1998 |
| JP | 2010534999 A | 11/2010 |
| JP | 2011504029 A | 1/2011 |
| JP | 2011505747 A | 2/2011 |
| JP | 2011525334 A | 9/2011 |
| WO | WO-2009073101 A1 | 6/2009 |
| WO | WO-2009092319 A1 | 7/2009 |
| WO | WO-2009154640 A2 | 12/2009 |
| WO | WO-2009155438 A1 | 12/2009 |

OTHER PUBLICATIONS

3rd Generation Partnership Project; Technical Specification Group Services and System Aspects; Multi access PDN connectivity and IP flow mobility (Release 9), 3GPP Standard; 3GPP TR 23.861, 3rd Generation Partnership Project (3GPP), Mobile Competence Centre ; 650, Route Des Lucioles ; F-06921 Sophia-Antipolis Cedex ; France, No. V1.3.0, Feb. 10, 2010, pp. 1-49, XP050401888, [retrieved on Feb. 10, 2010].
International Search Report and Written Opinion—PCT/US2011/033103—ISA/EPO—Jul. 25, 2011.

* cited by examiner

*Primary Examiner* — Albert T Chou
(74) *Attorney, Agent, or Firm* — François A. Pelaez

(57) ABSTRACT

Techniques are provided for efficient detachment from or attachment to wireless network(s). In one example, there is provided a method, operable by the user equipment (UE), that may involve connecting to a first wireless network (e.g., a 3GPP network) associated with a first access point name (APN), and connecting to a second wireless network (e.g., a WAN) associated with a second APN. The method may involve performing handover for the first APN from the first wireless network to the second wireless network. The method may involve performing detach for the first APN from the second wireless network.

36 Claims, 18 Drawing Sheets

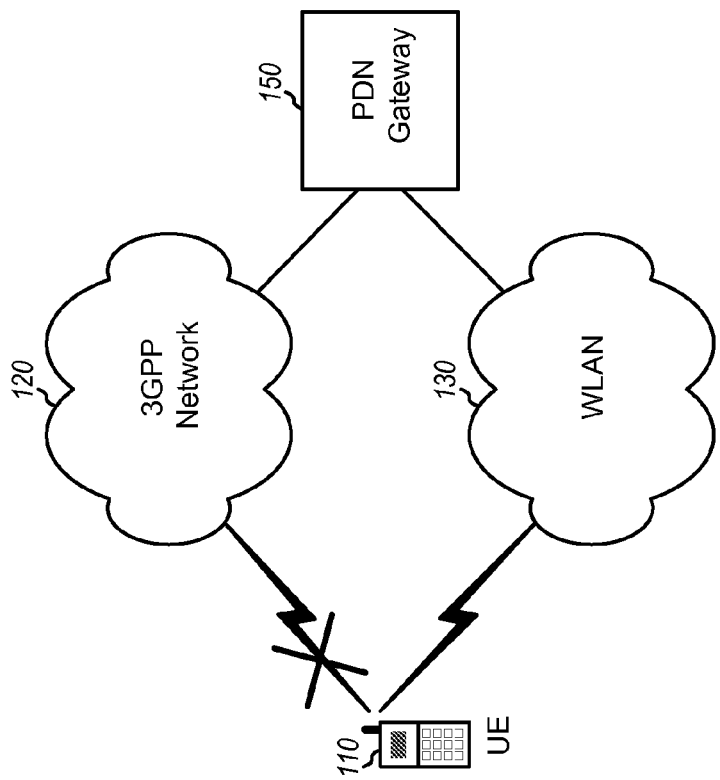
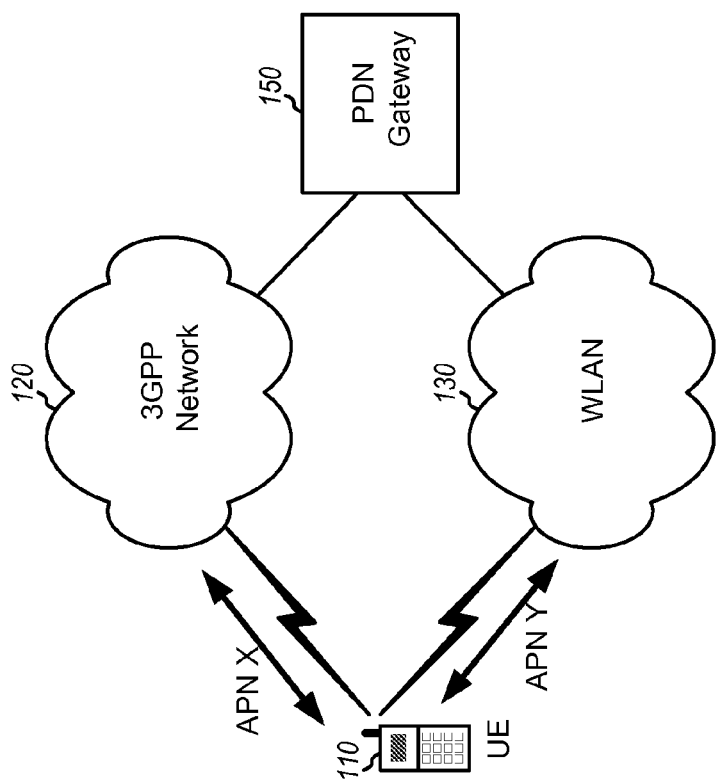

METHOD AND APPARATUS FOR DETACHMENT FROM A WIRELESS COMMUNICATION NETWORK

CLAIM OF PRIORITY UNDER 35 U.S.C. §119

The present Application for patent claims priority to Provisional Application No. 61/325,758 filed Apr. 19, 2010, entitled "METHOD AND APPARATUS FOR DETACHMENT FROM A WIRELESS COMMUNICATION NETWORK", and is assigned to the assignee hereof, and is hereby expressly incorporated in its entirety by reference herein.

BACKGROUND

I. Field

The present disclosure relates generally to communication, and more specifically to techniques for detachment from a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile entities, such as, for example, user equipments (UEs). A UE may communicate with a base station via the downlink and uplink. The downlink (or forward link) refers to the communication link from the base station to the UE, and the uplink (or reverse link) refers to the communication link from the UE to the base station.

A UE may be able to communicate with one or more wireless networks at any given moment. For example, the UE may attach to a wireless network in order to establish a connection and transmit and/or receive data. The UE may detach from the wireless network and release the connection to end communication with the wireless network. In this context, there is need for enabling the UE to efficiently attach to and/or detach from a given wireless network. There is also a need for enabling network entities to facilitate efficient attachment and/or detachment of the UE from the given wireless network.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with methods for detachment of a UE from a wireless communication network. In one embodiment, there is provided a detachment method that may be performed by a UE or the like. The method may involve connecting to a first wireless network (e.g., a 3GPP network) associated with a first access point name (APN), and connecting to a second wireless network (e.g., a WAN) associated with a second APN. The method may involve performing handover for the first APN from the first wireless network to the second wireless network. The method may involve performing detach for the first APN from the second wireless network. In related aspects, an electronic device (e.g., a UE or component(s) thereof) may be configured to execute the above described methodology.

In another embodiment, there is provided a detachment method that may be performed by a mobility management entity (MME) or the like. The method may involve storing information for a first APN associated with a first connection between a UE and a first wireless network, the UE having a second connection for a second wireless network associated with a second APN. The method may involve removing the information for the first APN, in response to the UE performing handover for the first APN from the first wireless network to the second wireless network, the UE further performing detach for the first APN from the second wireless network. In related aspects, an electronic device (e.g., an MME or component(s) thereof) may be configured to execute the above described methodology.

In yet another embodiment, there is provided a detachment method that may be performed by a packet data network (PDN) gateway or the like. The method may involve storing information for a first APN associated with a first connection between a UE and a first wireless network. The method may involve storing information for a second APN associated with a second connection between the UE and a second wireless network. The method may involve receiving an indication of handover for the first APN from the first wireless network to the second wireless network. The method may involve performing a procedure to disconnect the first connection between the UE and the first wireless network, wherein information for the second APN is retained by a home subscriber server (HSS) as a result of the procedure. In related aspects, an electronic device (e.g., a PDN gateway or component(s) thereof) may be configured to execute the above described methodology.

In still another embodiment, there is provided a detachment method that may be performed by an HSS or the like. The method may involve storing information for a first APN associated with a first connection between a UE and a first wireless network. The method may involve storing information for a second APN associated with a second connection between the UE and a second wireless network. The method may involve performing a procedure to disconnect the first connection between the UE and the first wireless network. The method may involve removing the information for the first APN and retaining the information for the second APN as a result of the procedure. In related aspects, an electronic device (e.g., an HSS or component(s) thereof) may be configured to execute the above described methodology.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 2B illustrates a UE communicating with both a 3GPP network and a WLAN.

FIG. 2C illustrates a UE communicating with a WLAN after detachment from a 3GPP network.

DETAILED DESCRIPTION

Techniques for detachment from a wireless network are described herein. The techniques may be used for various wireless communication networks such as wireless wide area networks (WWANs) and wireless local area networks (WLANs). The terms "network" and "system" are often used interchangeably. The WWANs may be CDMA, TDMA, FDMA, OFDMA, SC-FDMA and/or other networks. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). A WLAN may implement a radio technology such as IEEE 802.11 (Wi-Fi), Hiperlan, etc.

The techniques described herein may be used for the wireless networks and radio technologies mentioned above as well as other wireless networks and radio technologies. For clarity, certain aspects of the techniques are described below for 3GPP network and WLAN, and LTE and WLAN terminology is used in much of the description below. The word "exemplary" is used herein to mean "serving as an example, instance, or illustration." Any embodiment described herein as "exemplary" is not necessarily to be construed as preferred or advantageous over other embodiments.

Figure 1:
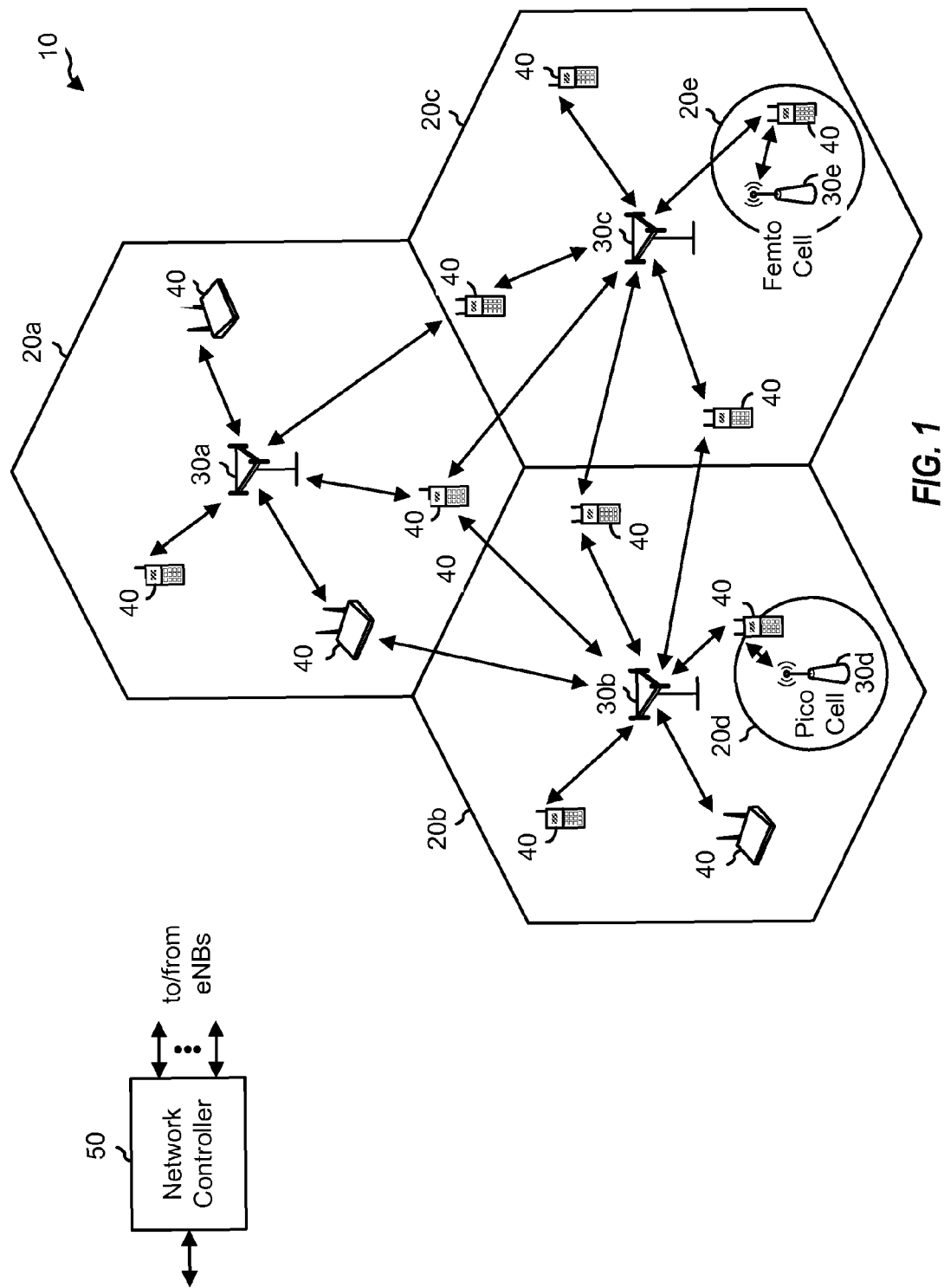
FIG. 1 shows a wireless communication network.

FIG. 1 shows a wireless communication network 10, which may be an LTE network or some other wireless network. Wireless network 10 may include a number of evolved Node Bs (eNBs) 30 and other network entities. An eNB may be an entity that communicates with mobile entities (e.g., user equipment (UE)) and may also be referred to as a base station, a Node B, an access point, etc. Although the eNB typically has more functionalities than a base station, the terms "eNB" and "base station" are used interchangeably herein. Each eNB 30 may provide communication coverage for a particular geographic area and may support communication for mobile entities (e.g., UEs) located within the coverage area. To improve network capacity, the overall coverage area of an eNB may be partitioned into multiple (e.g., three) smaller areas. Each smaller area may be served by a respective eNB subsystem. In 3GPP, the term "cell" can refer to the smallest coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, eNBs 30a, 30b, and 30c may be macro eNBs for macro cell groups 20a, 20b, and 20c, respectively. Each of the cell groups 20a, 20b, and 20c may include a plurality (e.g., three) of cells or sectors. An eNB 30d may be a pico eNB for a pico cell 20d. An eNB 30e may be a femto eNB or femto access point (FAP) for a femto cell 20e.

Wireless network 10 may also include relays (not shown in FIG. 1). A relay may be an entity that can receive a transmission of data from an upstream station (e.g., an eNB or a UE) and send a transmission of the data to a downstream station (e.g., a UE or an eNB). A relay may also be a UE that can relay transmissions for other UEs.

A network controller 50 may couple to a set of eNBs and may provide coordination and control for these eNBs. Network controller 50 may comprise a single network entity or a collection of network entities. Network controller 50 may communicate with the eNBs via a backhaul. The eNBs may also communicate with one another, e.g., directly or indirectly via a wireless or wireline backhaul.

UEs 40 may be dispersed throughout wireless network 10, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. A UE may be able to communicate with eNBs, relays, etc. A UE may also be able to communicate peer-to-peer (P2P) with other UEs.

Wireless network 10 may support operation on a single carrier or multiple carriers for each of the downlink and uplink. A carrier may refer to a range of frequencies used for communication and may be associated with certain characteristics. Operation on multiple carriers may also be referred to as multi-carrier operation or carrier aggregation. A UE may operate on one or more carriers for the downlink (or downlink carriers) and one or more carriers for the uplink (or uplink carriers) for communication with an eNB. The eNB may send data and control information on one or more downlink carriers to the UE. The UE may send data and control information on one or more uplink carriers to the eNB. In one design, the downlink carriers may be paired with the uplink carriers. In this design, control information to support data transmission on a given downlink carrier may be sent on that downlink carrier and an associated uplink carrier. Similarly, control information to support data transmission on a given uplink carrier may be sent on that uplink carrier and an associated downlink carrier. In another design, cross-carrier control may be supported. In this design, control information to support data transmission on a given downlink carrier may be sent on another downlink carrier (e.g., a base carrier) instead of the downlink carrier.

Wireless network 10 may support carrier extension for a given carrier. For carrier extension, different system bandwidths may be supported for different UEs on a carrier. For example, the wireless network may support (i) a first system bandwidth on a downlink carrier for first UEs (e.g., UEs supporting LTE Release 8 or 9 or some other release) and (ii) a second system bandwidth on the downlink carrier for second UEs (e.g., UEs supporting a later LTE release). The second system bandwidth may completely or partially overlap the first system bandwidth. For example, the second system bandwidth may include the first system bandwidth and additional bandwidth at one or both ends of the first system bandwidth. The additional system bandwidth may be used to send data and possibly control information to the second UEs.

Wireless network 10 may support data transmission via single-input single-output (SISO), single-input multiple-output (SIMO), multiple-input single-output (MISO), and/or multiple-input multiple-output (MIMO). For MIMO, a transmitter (e.g., an eNB) may transmit data from multiple transmit antennas to multiple receive antennas at a receiver (e.g., a UE). MIMO may be used to improve reliability (e.g., by transmitting the same data from different antennas) and/or to improve throughput (e.g., by transmitting different data from different antennas).

Wireless network 10 may support single-user MIMO, multi-user MIMO, Coordinated Multi-Point (CoMP), etc. For SU-MIMO, a cell may transmit multiple data streams to a single UE on a given time-frequency resource with or without precoding. For MU-MIMO, a cell may transmit multiple data streams to multiple UEs (e.g., one data stream to each UE) on the same time-frequency resource with or without precoding. CoMP may include cooperative transmission and/or joint processing. For cooperative transmission, multiple cells may transmit one or more data streams to a single UE on a given time-frequency resource such that the data transmission is steered toward the intended UE and/or away from one or more interfered UEs. For joint processing, multiple cells may transmit multiple data streams to multiple UEs (e.g., one data stream to each UE) on the same time-frequency resource with or without precoding.

Wireless network 10 may support hybrid automatic retransmission (HARQ) in order to improve reliability of data transmission. For HARQ, a transmitter (e.g., an eNB) may send a transmission of a data packet (or transport block) and may send one or more additional transmissions, if needed, until the packet is decoded correctly by a receiver (e.g., a UE), or the maximum number of transmissions has been sent, or some other termination condition is encountered. The transmitter may thus send a variable number of transmissions of the packet.

Wireless network 10 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

Wireless network 10 may utilize FDD or TDD. For FDD, the downlink and uplink may be allocated separate frequency channels, and downlink transmissions and uplink transmissions may be sent concurrently on the two frequency channels. For TDD, the downlink and uplink may share the same frequency channel, and downlink and uplink transmissions may be sent on the same frequency channel in different time periods. In related aspects, the FAP synchronization algorithm described in further detail below may be applied to the FAPs using FDD or TDD duplexing.

Figure 2A:
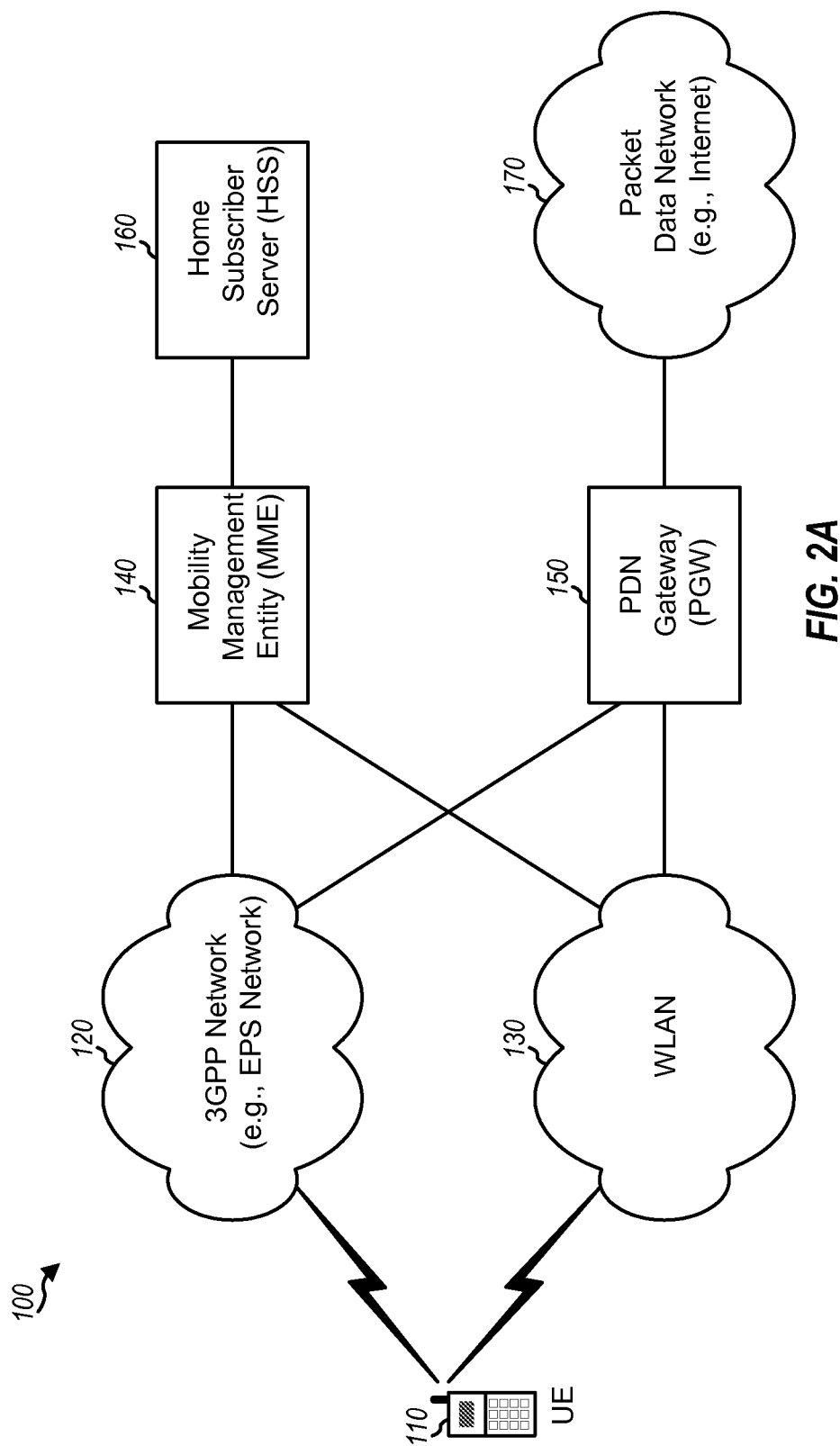
FIG. 2A illustrates an exemplary communication system with a 3GPP network and a WLAN.

FIG. 2A shows an exemplary deployment 100 of a 3GPP network 120 and a WLAN 130. 3GPP network 120 may be an Evolved Packet System (EPS) network, a Universal Mobile Telecommunications System (UMTS) network, or some other 3GPP network. An EPS network may include an Evolved Universal Terrestrial Radio Access Network (E-UTRAN) and one or more serving gateways (SGW) (not shown in FIG. 2A). The E-UTRAN may include a number of evolved Node Bs (eNBs) that support radio communication for UEs. An eNB may be an entity that communicates with the UEs and may also be referred to as a Node B, a base station, an access point, etc. A serving gateway may perform various functions such as support for handover between eNBs, buffering, routing and forwarding of data for UEs, initiation of network-triggered service request procedure, accounting functions for charging, etc.

A mobility management entity (MME) 140 may perform various functions such as control of signaling and security for a Non Access Stratum (NAS), authentication and mobility management of UEs, selection of gateways for UEs, bearer management functions, etc. A packet data network (PDN) gateway 150 may perform various functions such as packet filtering and allocation of Internet Protocol (IP) address for UEs, service level gating control and rate enforcement, dynamic host configuration protocol (DHCP) functions for client and server, gateway GPRS support node (GGSN) functionality, etc. PDN gateway 150 may exchange (e.g., transmit and/or receive) data with a packet data network 170, which may be the Internet, a packet data network of a home network operator, or a public or private packet data network external to the home network operator.

A home subscriber server (HSS) 160 may store subscription-related information (e.g., user profiles) and location information for UEs that have service subscriptions in a home public land mobile network (HPLMN) to which HSS 160 belongs. HSS 160 may perform authentication and authorization of UEs and may provide information for UEs to requesting network entities. HSS 160 may also store other information for UEs.

A number of UEs may be dispersed throughout the wireless networks, and each UE may be stationary or mobile. For simplicity, only one UE 110 is shown in FIG. 2A. UE 110 may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc. UE 110 may be able to communicate with 3GPP network 120, WLAN 130, and/or other wireless networks at any given moment.

UE 110 may have a service subscription with the HPLMN and may have its subscription-related information stored in HSS 160. UE 110 may be able to receive one or more data services such as Internet connectivity, short message service (SMS), instant messaging (IM), wireless application protocol (WAP) access, multimedia streaming, multimedia messaging, etc. The data services may also be referred to as IP multimedia subsystem (IMS) services. Each data service may be associated with an access point name (APN), which may be associated with a PDN to which UE 110 can be connected, a set of settings to use for a data connection, settings in UE 110 for the data connection, etc. A data connection may be an association between a UE represented by an IP address and a PDN represented by an APN. A data connection may also be referred to as an IP connection, a PDN connection, etc. UE 110 may be able to receive one or more data services associated with one or more APNs at any given moment.

An APN may be given by a string for a logical name used to select a PDN gateway or a home agent for a data service. Different network operators may define APN differently. For example, a network operator may define an APN to include (i) an operator identifier (ID) that identifies the network operator and (ii) a network ID that specifies routing information for the network operator. A network operator may also define an APN based on service, e.g., "sms.xyz.com", where "sms" denotes a service and "xyz" is the name of the network operator. In general, an APN may specify a point of attachment for a UE for a particular data service.

UE 110 may concurrently connect to both 3GPP network 120 and WLAN 130. UE 110 may have a data service associated with a first APN (referred to as APN X), which may be associated with PDN gateway 150 and further bound to 3GPP access via 3GPP network 120. UE 110 may have another data service associated with a second APN (referred to as APN Y), which may also be associated with PDN gateway 150 and further bound to WLAN access via WLAN 130. The mapping of traffic data at UE 110 to a particular radio interface may be performed on an APN basis, and the granularity level may be per APN.

FIG. 2B shows UE 110 communicating with both 3GPP network 120 and WLAN 130. UE 110 may route all traffic data for APN X via 3GPP network 120. UE 110 may route all traffic data for APN Y via WLAN 130. FIG. 2C shows UE 110 communicating with WLAN 130 after detachment from 3GPP network 120. UE 110 may desire to switch off 3GPP access and shut down traffic data for APN X. UE 110 may perform a detach procedure in order to close/release a data connection for APN X via 3GPP network 120. UE 110 may continue to route all traffic data for APN Y via WLAN 130. In general, UE 110 may be connected to a 3GPP network, a WLAN, and/or other wireless networks. UE 110 may exchange traffic data for one or more APNs via the 3GPP network. UE 110 may desire to close the data connections for all APNs associated with the 3GPP network. This may be achieved as described below.

Figure 3:
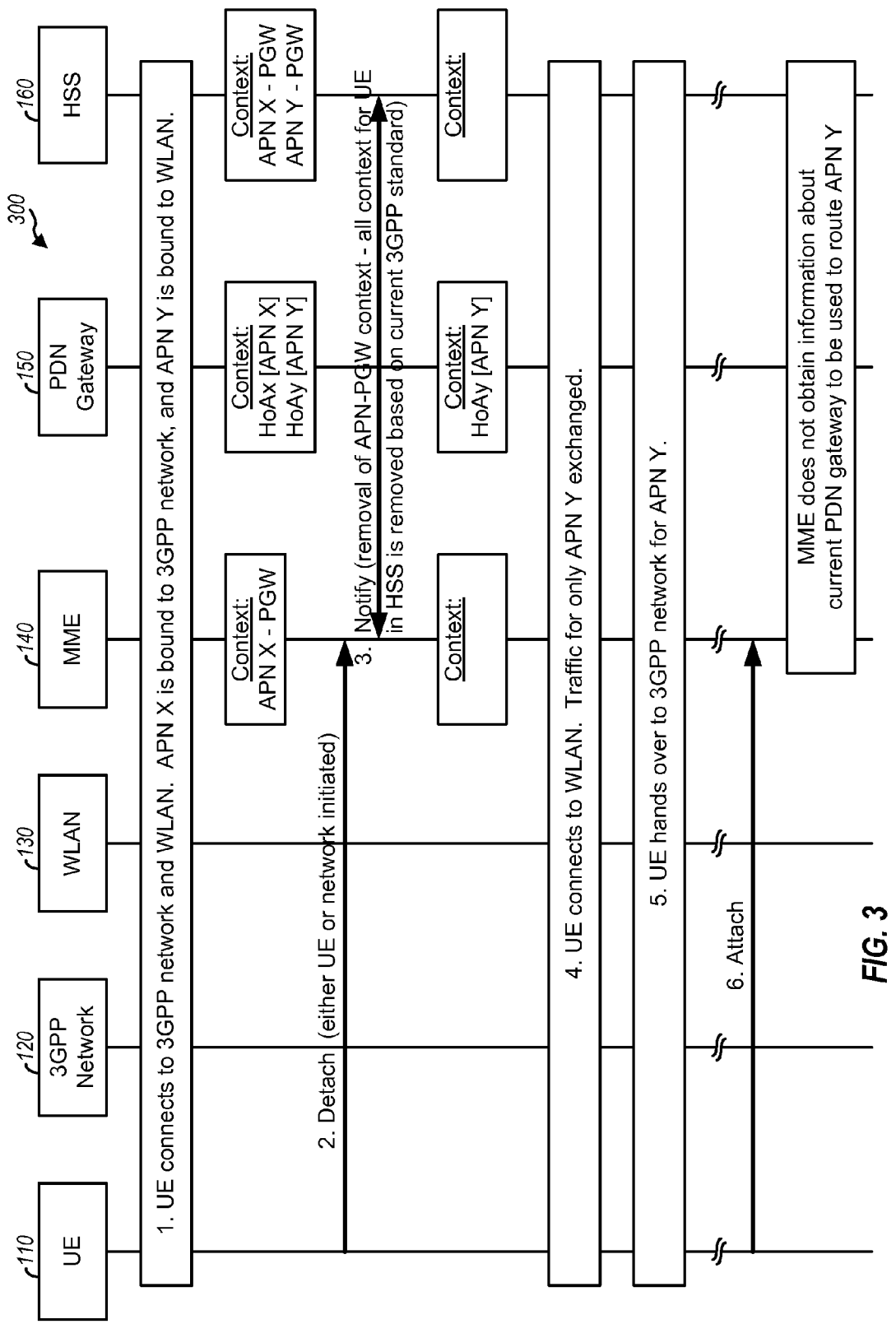
FIG. 3 is a sequence diagram showing the message flow for a UE communicating with different networks for different APNs.

FIG. 3 shows a message flow 300 for UE 110 communicating with different wireless networks for different APNs. UE 110 may be connected to 3GPP network 120 and WLAN 130 (step 1). UE 110 may have APN X bound to 3GPP access via 3GPP network 120 and associated with PDN gateway 150. UE 110 may also have APN Y bound to WLAN access via WLAN 130 and associated with PDN gateway 150.

MME 140, PDN gateway 150, and HSS 160 may store context for UE 110 for 3GPP access associated with APN X and WLAN access associated with APN Y. The context stored at each network entity may include pertinent information for a data service and a data connection associated with each APN. MME 140 may store context indicating the use of PDN gateway 150 for APN X for UE 110 for 3GPP access via 3GPP network 120. PDN gateway 150 may store context indicating the use of home address (HoA) x for APN X and the use of HoA y for APN Y for UE 110. A home address is an IP address allocated by a PDN gateway to a UE, and the UE may use the allocated home address as an IP address for its applications. In FIG. 3, HoA x may be an IP address of a PDN associated with APN X, and HoA y may be an IP address associated with APN Y. PDN gateway 150 may route traffic data for APN X using HoA x and may route traffic data for APN Y using HoA y. HSS 160 may store context indicating the use of PDN gateway 150 for both APNs X and Y for UE 110.

UE 110 may exchange traffic data for APN X via 3GPP network 120 and PDN gateway 150 and/or may exchange traffic data for APN Y via WLAN 130 and PDN gateway 150. At some point, UE 110 or 3GPP network 120 may initiate a detach procedure to detach UE 110 from 3GPP network 120 (step 2). As part of the detach procedure, MME 140 may remove all context for UE 110. MME 140 may also inform HSS 160 to remove all context for UE 110 in accordance with current 3GPP standard (step 3). PDN gateway 150 may remove context for APN X and may retain context for APN Y for UE 110. After completing the detach procedure, only PDN gateway 150 may store context for UE 110.

After detaching from 3GPP network 120, UE 110 may connect to WLAN 130 and may exchange traffic data for APN Y via WLAN 130 and PDN gateway 150 (step 4). UE 110 may be handed over from WLAN 130 to 3GPP network 120 for APN Y (step 5). UE 110 may then perform an attach procedure to attach to 3GPP network 120 (step 6). However, HSS 160 has cleared the context for APN Y for UE 110 during the previous detach procedure. Consequently, MME 140 cannot obtain pertinent information for APN X from HSS 160 and cannot determine the proper PDN gateway to use to route traffic data for APN Y.

As shown in message flow 300, MME 140 may not receive information for APN Y from HSS 160 when UE 110 attempts to move APN Y from WLAN 130 to 3GPP network 120. As a result, one or more of the following error cases may occur:

MME 140 may assign a new PDN gateway to UE 110 for the same APN Y, and

UE 110 may obtain an IPv6 prefix in the E-UTRAN in 3GPP network 120, and this IPv6 prefix may be different from an IPv6 prefix for a Home Network Prefix (HNP) and therefore session continuity will not be provided.

The above error cases may be avoided if information for APN Y is maintained at HSS 160 after detachment for APN Y from 3GPP network 120.

In an aspect, UE 110 with pending APN X for 3GPP network 120 and APN Y for WLAN 130 may avoid having information for APN Y being discarded by HSS 160 due to detachment from 3GPP network 120 (as shown in FIG. 3) by first performing handover of APN X from 3GPP network 120 to WLAN 130 and then performing detach of APN X from WLAN 130. Detaching from 3GPP network 120 may result in all context for both APNs X and Y being removed from HSS 160, as shown in FIG. 3. Detaching from WLAN 130 for APN X may result in the context for only APN X being removed from HSS 160. Information for APN Y may be retained by HSS 160 after performing detach for APN X via WLAN 130.

Figure 4:
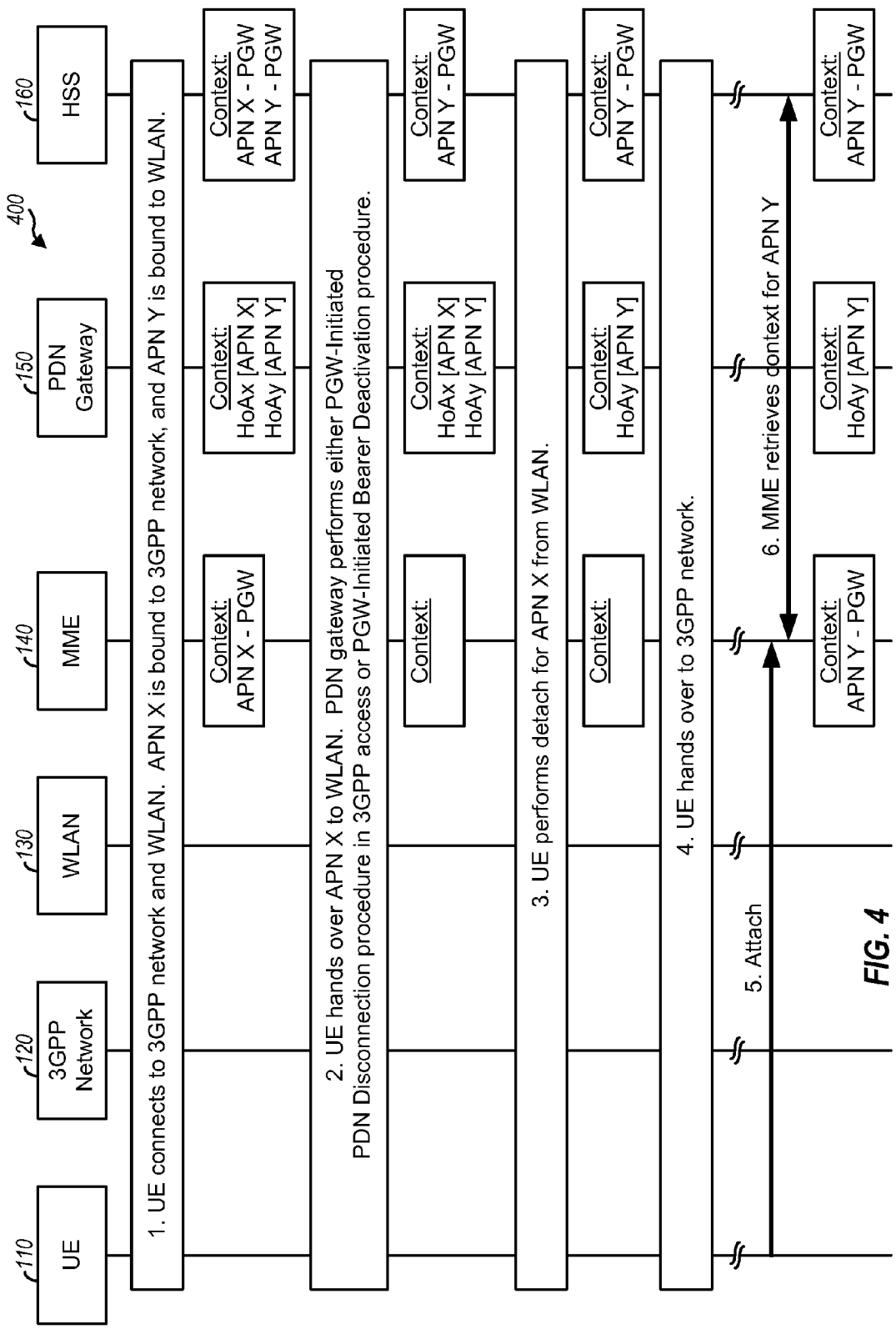
FIG. 4 is a sequence diagram showing an embodiment of a technique for detachment of a UE from a given wireless network.

FIG. 4 shows a message flow 400 for UE 110 communicating with different wireless networks for different APNs and performing detach in a manner to avoid removing all context from HSS 160. UE 110 may be connected to 3GPP network 120 and WLAN 130 (step 1). UE 110 may have APN X bound to 3GPP access via 3GPP network 120 and associated with PDN gateway 150. UE 110 may also have APN Y bound to WLAN access via WLAN 130 and associated with PDN gateway 150. MME 140 may store context for APN X for UE 110. PDN gateway 150 may store context for both APNs X and Y for UE 110. HSS 160 may store context for both APNs X and Y for UE 110.

UE 110 may exchange traffic data for APN X via 3GPP network 120 and PDN gateway 150 and/or may exchange traffic data for APN Y via WLAN 130 and PDN gateway 150. At some point, UE 110 or 3GPP network 120 may desire to detach UE 110 from 3GPP network 120. UE 110 may then perform handover of APN X from 3GPP network 120 to WLAN 130 (step 2). As part of the handover, PDN gateway 150 may perform either a PDN gateway initiated PDN disconnection procedure in 3GPP access or a PDN gateway initiated bearer deactivation procedure. As a result of the PDN disconnection procedure or the bearer deactivation procedure, MME 140 and HSS 160 may both remove context for APN X for UE 110. However, HSS 160 may retain context for APN Y for UE 110. UE may then perform detach for APN X from WLAN 130 (step 3). As part of the detach, PDN gateway 150 may remove the context for APN X but may retain the context for APN Y for UE 110.

After detaching for APN X, UE 110 may be handed over from WLAN 130 to 3GPP network 120 for APN Y (step 4). UE 110 may perform an attach procedure to attach to 3GPP network 120 (step 5). MME 140 may retrieve the context for APN Y from HSS 160 (step 6) and can determine the proper PDN gateway to use to route traffic data for APN Y. Thereafter, UE 110 may exchange traffic data for APN Y via 3GPP network 120 and PDN gateway 150.

As shown in FIG. 4, UE 110 may hand over APN X from 3GPP network 120 to WLAN 130 and then perform detach for APN X via WLAN 120. This may avoid HSS 160 clearing all context for UE 110 due to detach from 3GPP network 120 for APN X. In general, before detaching from 3GPP network 120, UE 110 may hand over all APNs to WLAN 120, even the APNs to be removed. The handover to WLAN 120 may trigger a PDN disconnection procedure in 3GPP access but not the removal of the context for UE 110 in HSS 160. A subsequent detach via non-3GPP access does not trigger state cleaning in HSS 160 under current 3GPP standard. Consequently, HSS 160 would retain context for non-3GPP APNs for UE 110.

In view of exemplary systems shown and described herein, methodologies that may be implemented in accordance with the disclosed subject matter, will be better appreciated with reference to various flow charts. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g., device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 5A:
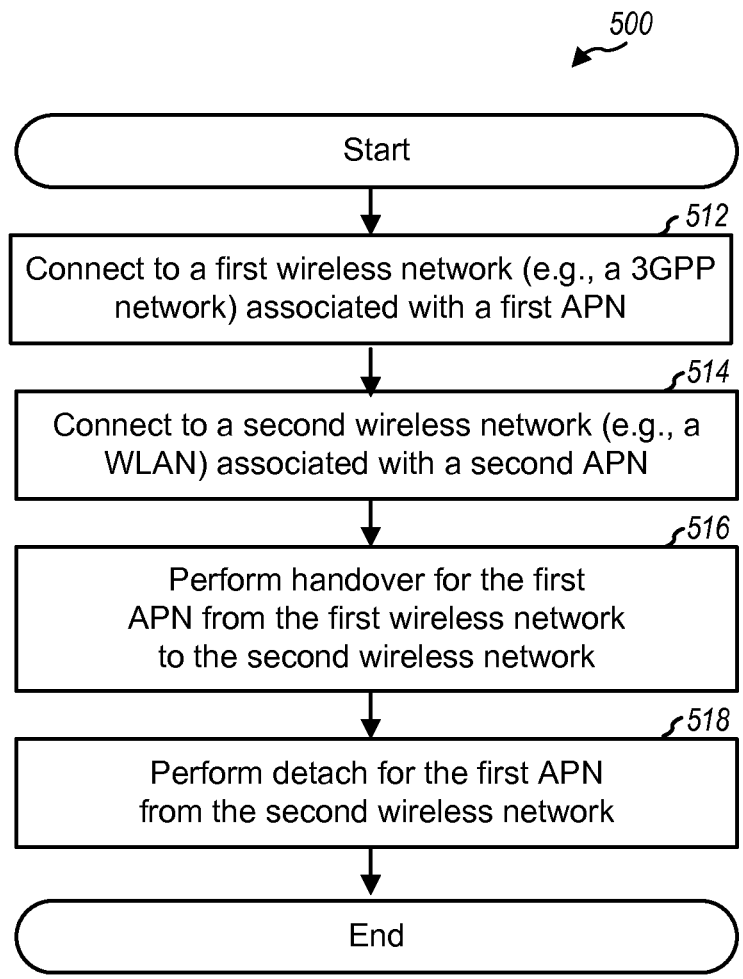
FIG. 5A illustrates an example detachment methodology executable by a UE.

In accordance with one or more aspects of the subject of this disclosure, FIG. 5A shows a design of a method/process 500 for wireless communication. Method 500 may be performed by a UE (as described below) or by some other entity. The UE may connect to a first wireless network (e.g., a 3GPP network) associated with a first APN (block 512). The UE may also connect to a second wireless network (e.g., a WLAN) associated with a second APN (block 514). In one design, the first wireless network may comprise a 3GPP network (e.g., an EPS network), and the second wireless network may comprise a WLAN. The first and second wireless networks may also comprise other types of wireless networks.

The UE may perform handover for the first APN from the first wireless network to the second wireless network (block 516). The UE may then perform detach for the first APN from the second wireless network (block 518). In one design, the UE may receive an indication to detach from the first wireless network. The handover in block 516 and the detach in block 518 may be performed in response to the indication. An HSS may retain information for the second APN after the handover in block 516 and also after the detach in block 518. The HSS may discard the information for the second APN if a detach for the first APN from the first wireless network is performed.

In general, the UE may have any number of APNs associated with the first wireless network. The UE may receive an indication to detach from the first wireless network and may desire to disconnect some or all of the APNs associated with the first wireless network. The UE may perform handover in block 512 for all APNs associated with the first wireless network and may perform detach in block 514 for each APN to be removed.

Figure 5B:
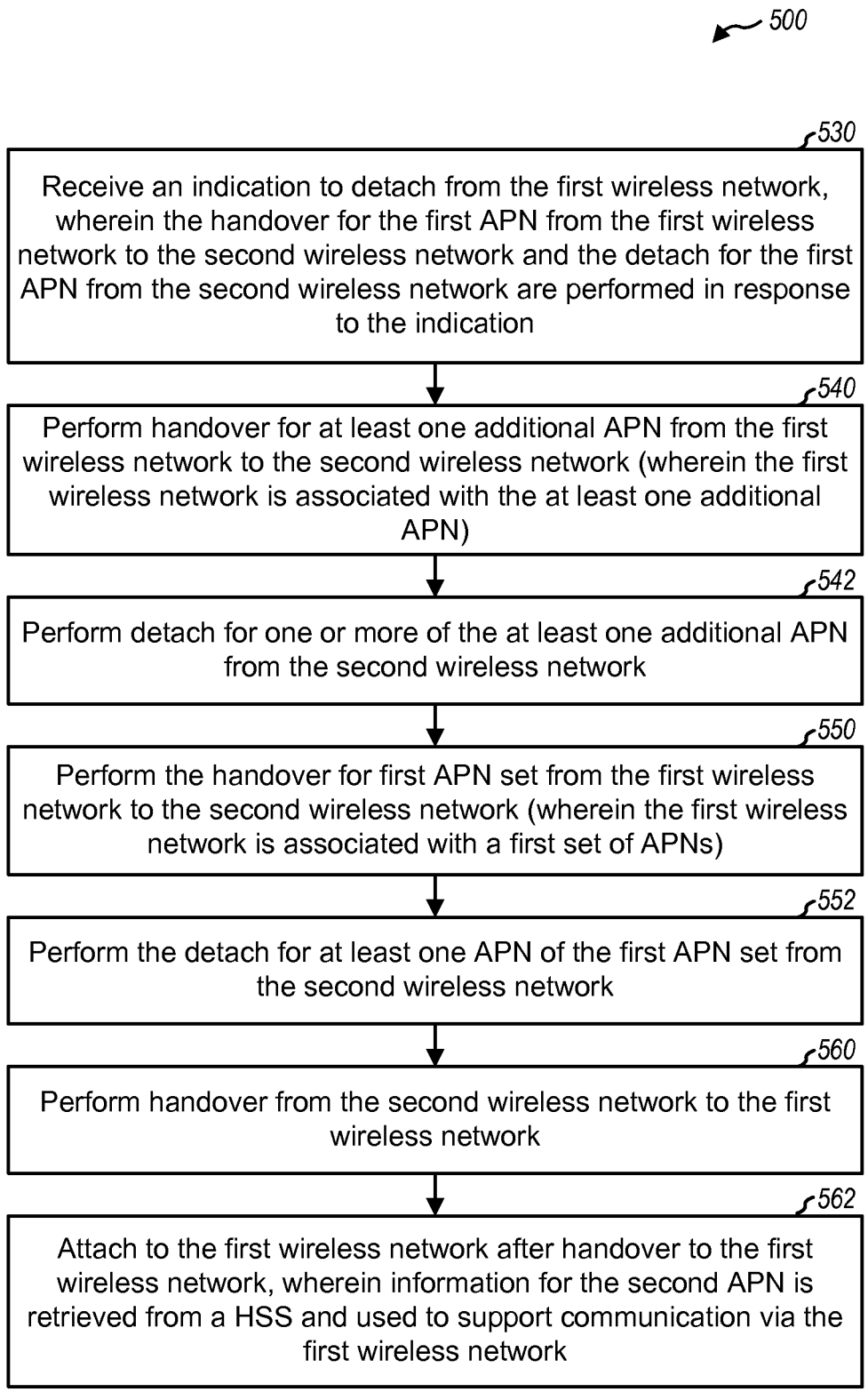
FIG. 5B illustrates further aspects of the methodology of FIG. 5A.

The UE may perform handover from the second wireless network to the first wireless network, and/or may attach to the first wireless network after handover to the first wireless network (see blocks 560, 562 of FIG. 5B). Information for the second APN may be retrieved by an MME from the HSS and may be used to support communication for the UE via the first wireless network.

With reference to FIG. 5B, there are shown further operations or aspects of method 500 that are optional and may be performed by a UE or the like for detachment. If the method 500 includes at least one block of FIG. 5B, then the method 500 may terminate after the at least one block, without necessarily having to include any subsequent downstream block(s) that may be illustrated. It is further noted that numbers of the blocks do not imply a particular order in which the blocks may be performed according to the method 500. It is also noted that the same holds for the optional blocks shown in FIGS. 7B, 9B, and 11B, for methods 700, 900, and 1100, respectively.

With reference once again to FIG. 5B, the method 500 may further involve receiving an indication to detach from the first wireless network, wherein the handover for the first APN from the first wireless network to the second wireless network and the detach for the first APN from the second wireless network are performed in response to the indication (block 530). In related aspects, the first wireless network may be associated with at least one additional APN, and the method 500 may involve: performing handover for the at least one additional APN from the first wireless network to the second wireless network (block 540); and/or performing detach for one or more of the at least one additional APN from the second wireless network (block 542).

In further related aspects, the first wireless network may be associated with a first set of APNs, and the method 500 may involve: performing the handover for the first APN set from the first wireless network to the second wireless network (block 550); and/or performing the detach for at least one APN of the first APN set from the second wireless network (block 552). The second wireless network may be associated with a second set of APNs.

In still related aspects, the method 500 may involve: performing handover from the second wireless network to the first wireless network (block 560); and/or attaching to the first wireless network after handover to the first wireless network, wherein information for the second APN is retrieved from an HSS and used to support communication via the first wireless network (block 562).

Figure 6:
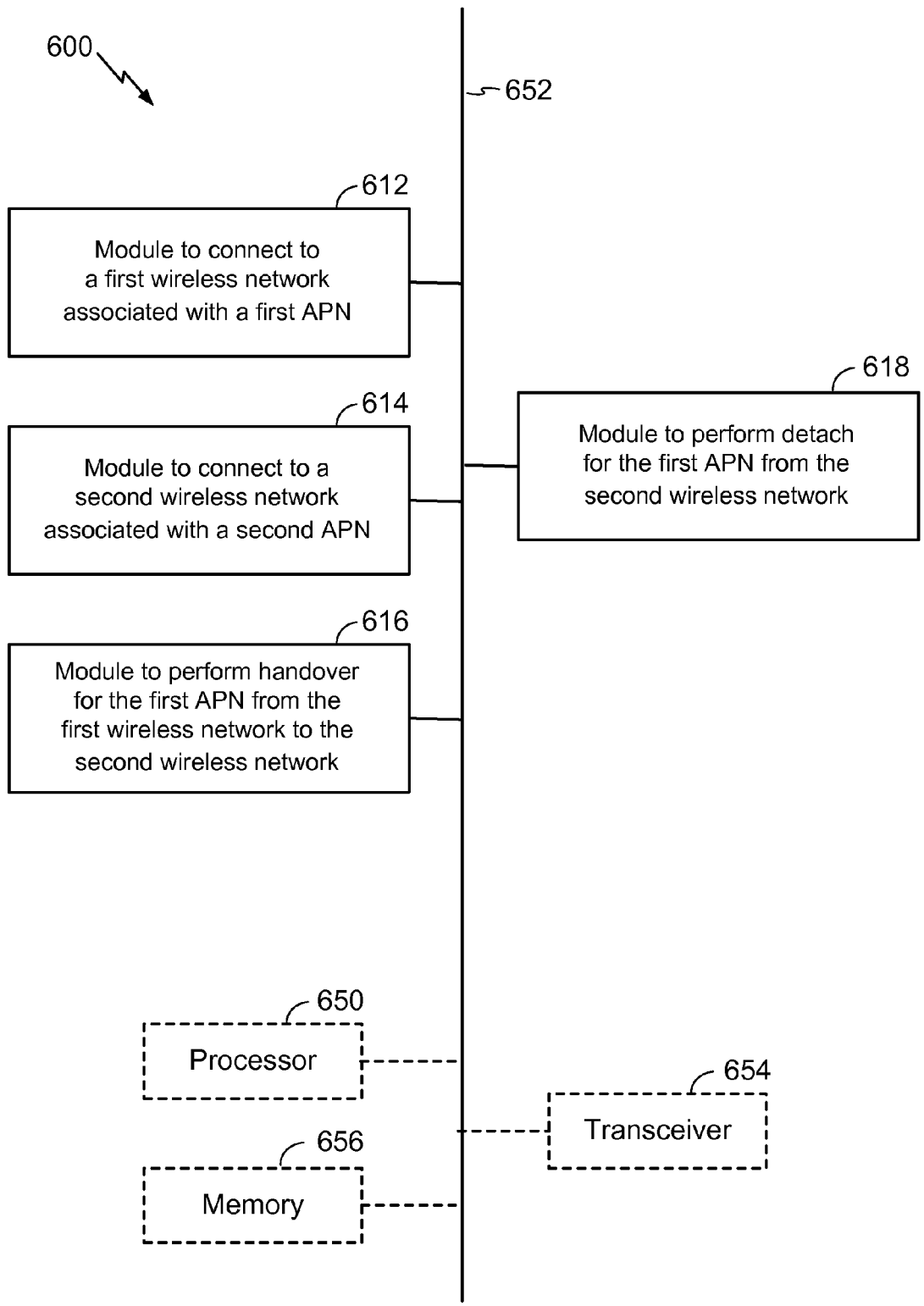
FIG. 6 shows an example apparatus for detachment from a wireless network, in accordance with the methodology of FIGS. 5A-B.

In accordance with one or more aspects of the embodiments described herein, there are provided devices and apparatuses for detachment, as described above with reference to FIGS. 5A-B. With reference to FIG. 6, there is provided an exemplary apparatus 600 that may be configured as a UE or the like in a wireless network, or as a processor or similar device for use within the UE, for supporting communication. The apparatus 600 may include functional blocks that can represent functions implemented by a processor, software, or combination thereof (e.g., firmware). For example, apparatus 600 may include: a module 612 to connect to a first wireless network associated with a first APN; a module 614 to connect to a second wireless network associated with a second APN; a module 616 to perform handover for the first APN from the first wireless network to the second wireless network; and a module 618 to perform detach for the first APN from the second wireless network.

In related aspects, the apparatus 600 may optionally include a processor component 650 having at least one processor, in the case of the apparatus 600 configured as a network entity, rather than as a processor. The processor 650, in such case, may be in operative communication with the components 612-618 via a bus 652 or similar communication coupling. The processor 650 may effect initiation and scheduling of the processes or functions performed by electrical components 612-618.

In further related aspects, the apparatus 600 may include a radio transceiver component 654. A stand alone receiver and/or stand alone transmitter may be used in lieu of or in conjunction with the transceiver 654. The apparatus 600 may optionally include a component for storing information, such as, for example, a memory device/component 656. The computer readable medium or the memory component 656 may be operatively coupled to the other components of the apparatus 600 via the bus 652 or the like. The memory component 656 may be adapted to store computer readable instructions and data for effecting the processes and behavior of the components 612-618, and subcomponents thereof, or the processor 650, or the methods disclosed herein. The memory component 656 may retain instructions for executing functions associated with the components 612-618. While shown as being external to the memory 656, it is to be understood that the components 612-618 can exist within the memory 656. It is further noted that the modules in FIG. 6 (as well as FIGS. 8, 10, and 12, discussed in detail below) may comprise processors, electronic devices, hardware devices, electronic components, logical circuits, memories, software codes, firmware codes, etc., or any combination thereof.

Figure 7A:
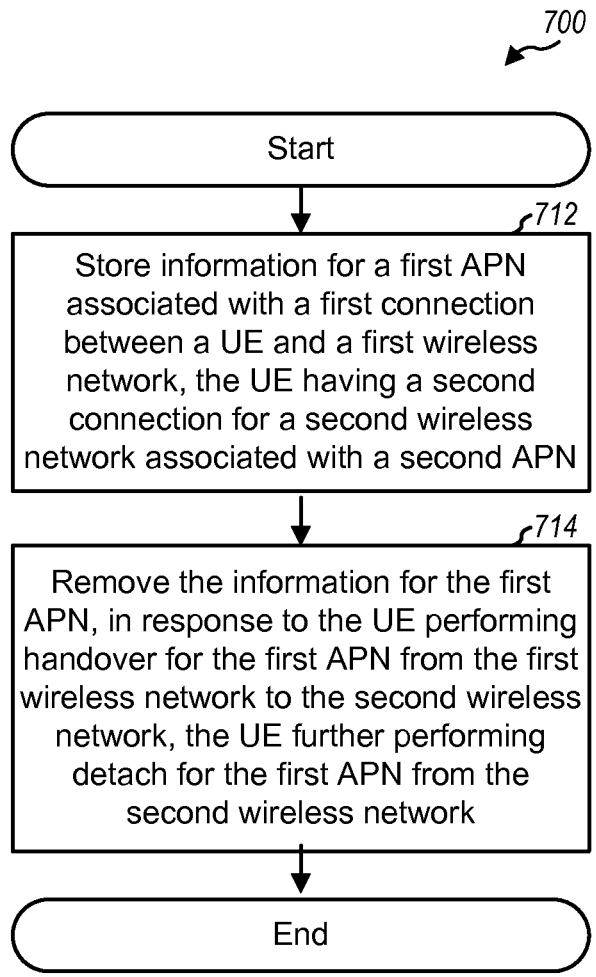
FIG. 7A illustrates an example detachment methodology executable by an MME.

In accordance with one or more aspects of the embodiments described herein, FIG. 7A shows a design of a method 700 for supporting communication. Method 700 may be performed by an MME (as described below) or by some other entity. The MME may store information for a first APN associated with a first connection between a UE and a first wireless network, e.g., a 3GPP network (block 712). The UE may have a second connection for a second wireless network (e.g., a WLAN) associated with a second APN. The MME may remove the information for the first APN, in response to the UE performing handover for the first APN from the first wireless network to the second wireless network (block 714). The UE may further perform detach for the first APN from the second wireless network. The MME may thereafter perform attach for the UE for handover from the second wireless network to the first wireless network, and/or may retrieve information for the second APN from an HSS for the attach for the UE (see blocks 720, 722 of FIG. 7B).

Figure 7B:
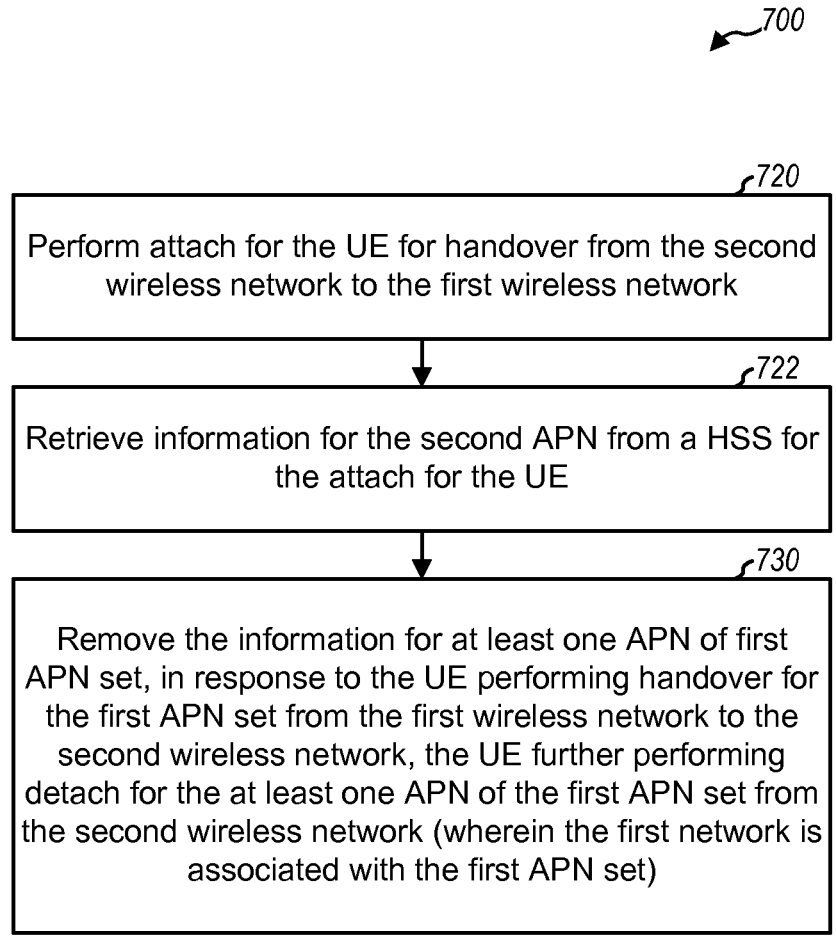
FIG. 7B illustrates further aspects of the methodology of FIG. 7A.

With reference to FIG. 7B, there are shown further operations or aspects of method 700 that are optional and may be performed by an MME or the like for detachment. For example, the method 700 may further involve: performing attach for the UE for handover from the second wireless network to the first wireless network (block 720); and/or retrieving information for the second APN from an HSS for the attach for the UE (block 722). In related aspects, the first wireless network may be associated with a first set of APNs, and the method 700 may involve removing the information for at least one APN of the first APN set, in response to the UE performing handover for the first APN set from the first wireless network to the second wireless network, the UE further performing detach for the at least one APN of the first APN set from the second wireless network (block 730). In further related aspects, the second wireless network may be associated with a second set of APNs.

Figure 8:
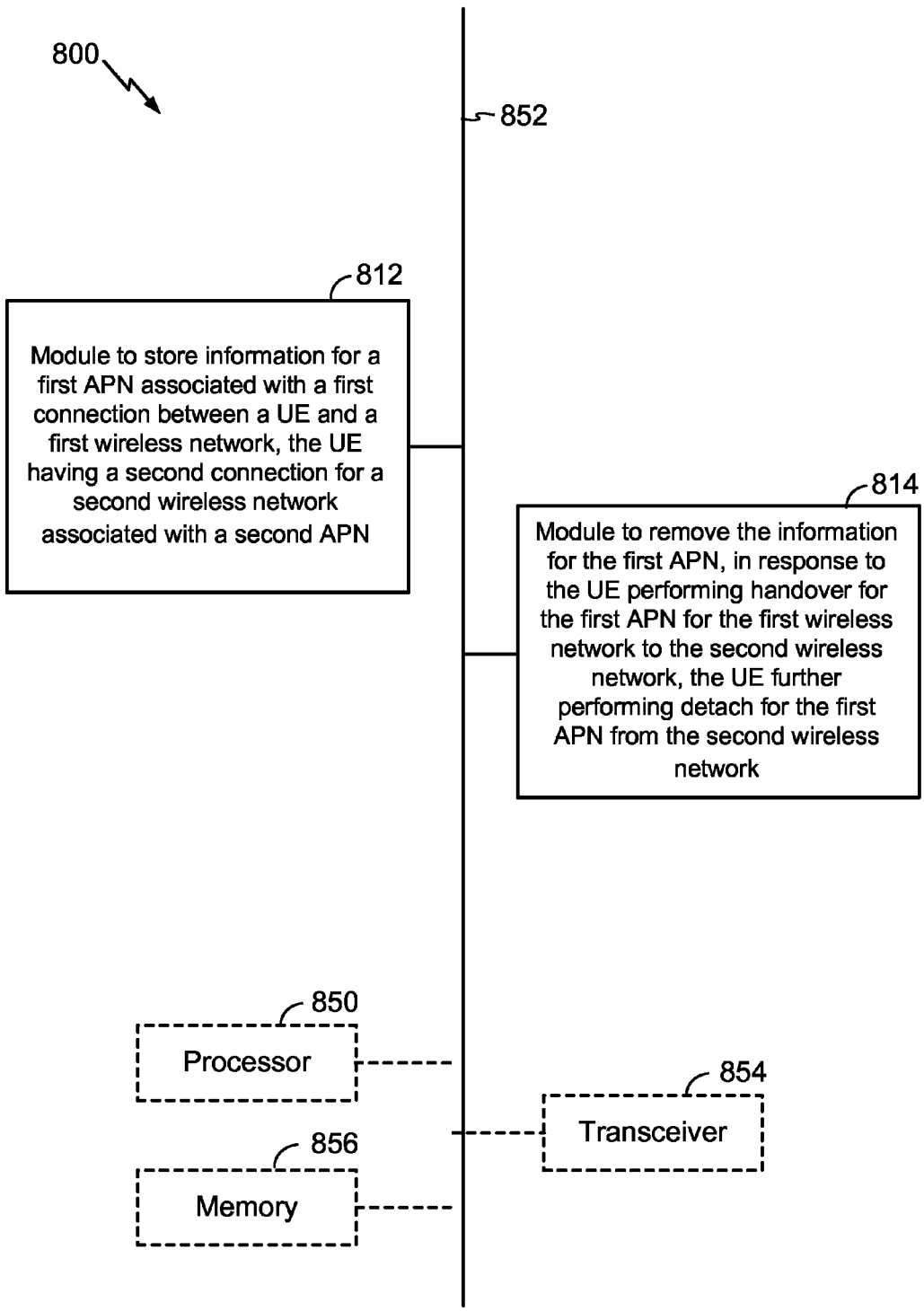
FIG. 8 shows an example apparatus for facilitating detachment of a UE from a wireless network, in accordance with the methodology of FIGS. 7A-B.

In accordance with one or more aspects of the embodiments described herein, FIG. 8, shows a design of an apparatus 800 (e.g., an MME or component thereof) for detachment, as described above with reference to FIGS. 7A-B. For example, apparatus 800 may include: a module 812 to store information for a first APN associated with a first connection between a UE and a first wireless network, the UE having a second connection for a second wireless network associated with a second APN; and a module 814 to remove the information for the first APN, in response to the UE performing handover for the first APN from the first wireless network to the second wireless network, the UE further performing detach for the first APN from the second wireless network. For the sake of conciseness, the rest of the details regarding apparatus 800 are not further elaborated on; however, it is to be understood that the remaining features and aspects of the apparatus 800 are substantially similar to those described above with respect to apparatus 600 of FIG. 6.

Figure 9A:
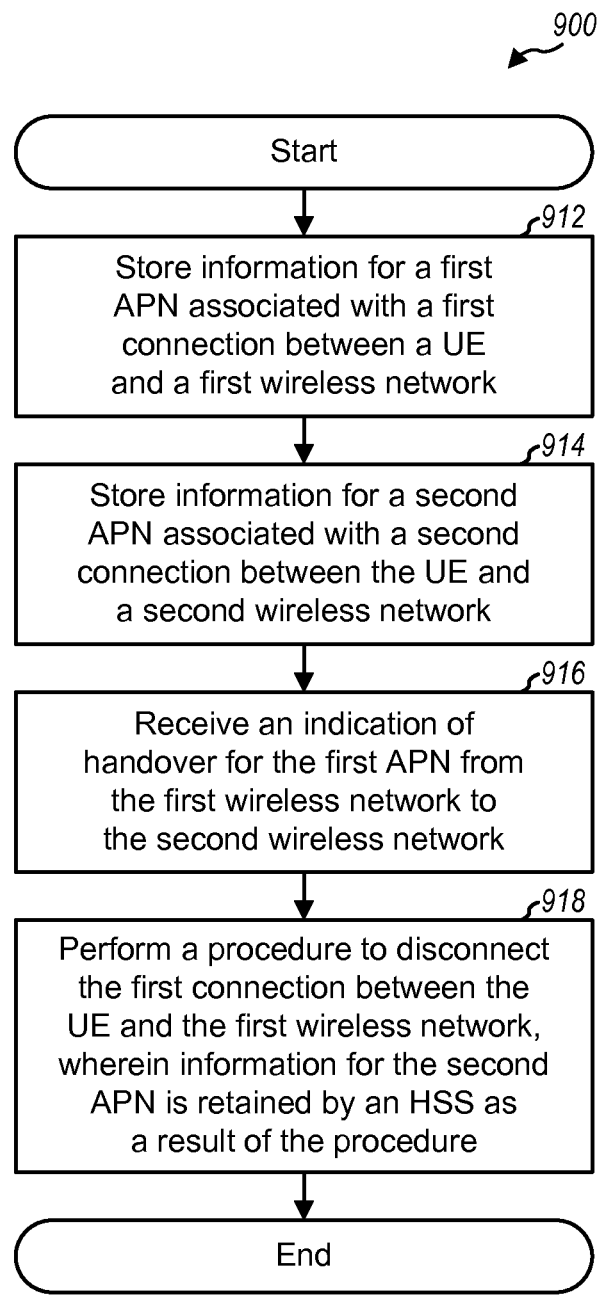
FIG. 9A illustrates an example detachment methodology executable by a PDN gateway.

In accordance with one or more aspects of the embodiments described herein, FIG. 9A shows a design of a method 900 for supporting communication. Method 900 may be performed by a PDN gateway (as described below) or by some other entity. The PDN gateway may store information for a first APN associated with a first connection between a UE and a first wireless network, e.g., a 3GPP network (block 912). The PDN gateway may also store information for a second APN associated with a second connection between the UE and a second wireless network, e.g., a WLAN (block 914). The PDN gateway may forward traffic data for the first APN based on the information for the first APN and may forward traffic data for the second APN based on the information for the second APN.

The PDN gateway may receive an indication of handover for the first APN from the first wireless network to the second wireless network (block 916). The PDN gateway may perform a procedure to disconnect the first connection between the UE and the first wireless network (block 918). This procedure may comprise a PDN disconnection procedure, or a bearer deactivation procedure, or some other procedure. An HSS may retain information for the second APN as a result of the procedure.

Figure 9B:
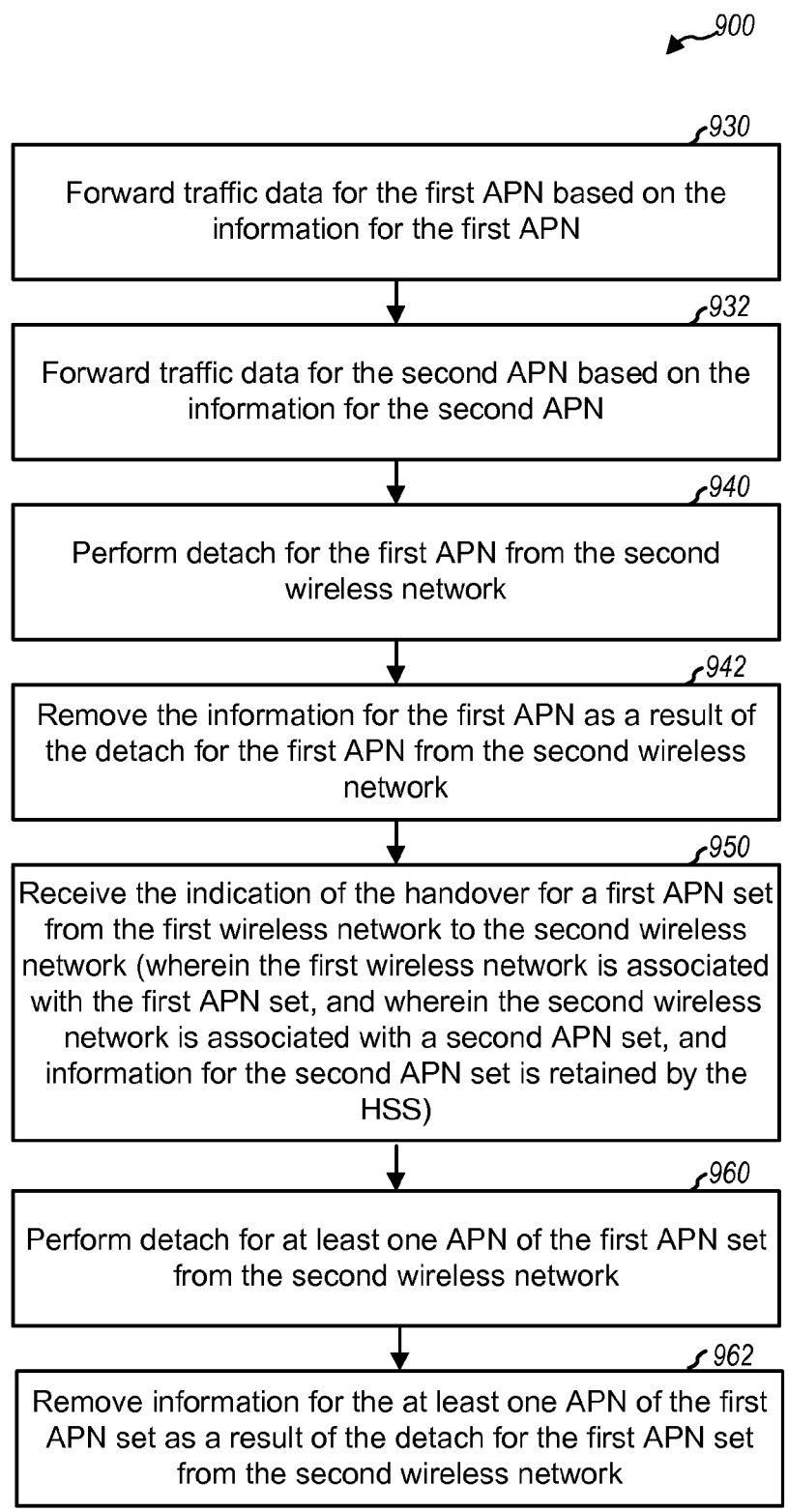
FIG. 9B illustrates further aspects of the methodology of FIG. 9A.

The PDN gateway may perform detach for the first APN from the second wireless network, and/or may remove the information for the first APN as a result of the detach for the first APN from the second wireless network (see blocks 940, 942 of FIG. 9B). The UE may thereafter perform handover from the second wireless network to the first wireless network. The PDN gateway may then forward traffic data for the second APN via the first wireless network based on the information for the second APN.

With reference to FIG. 9B, there are shown further operations or aspects of method 900 that are optional and may be performed by a PDN gateway or the like for detachment. For example, the method 900 may involve: forwarding traffic data for the first APN based on the information for the first APN (block 930); and/or forwarding traffic data for the second APN based on the information for the second APN (block 932). The method 900 may involve: performing detach for the first APN from the second wireless network (block 940); and/or removing the information for the first APN as a result of the detach for the first APN from the second wireless network (block 942).

In related aspects, the first wireless network may be associated with a first set of APNs, and the method 900 may involve receiving the indication of the handover for the first APN set from the first wireless network to the second wireless network (block 950). In further related aspects, the second wireless network may be associated with a second set of APNs, and information for the second APN set may be retained by the HSS. In yet further related aspects, the method 900 may involve: performing detach for at least one APN of the first APN set from the second wireless network (block 960); and/or removing information for the at least one APN of the first APN set as a result of the detach for the first APN set from the second wireless network (block 962).

Figure 10:
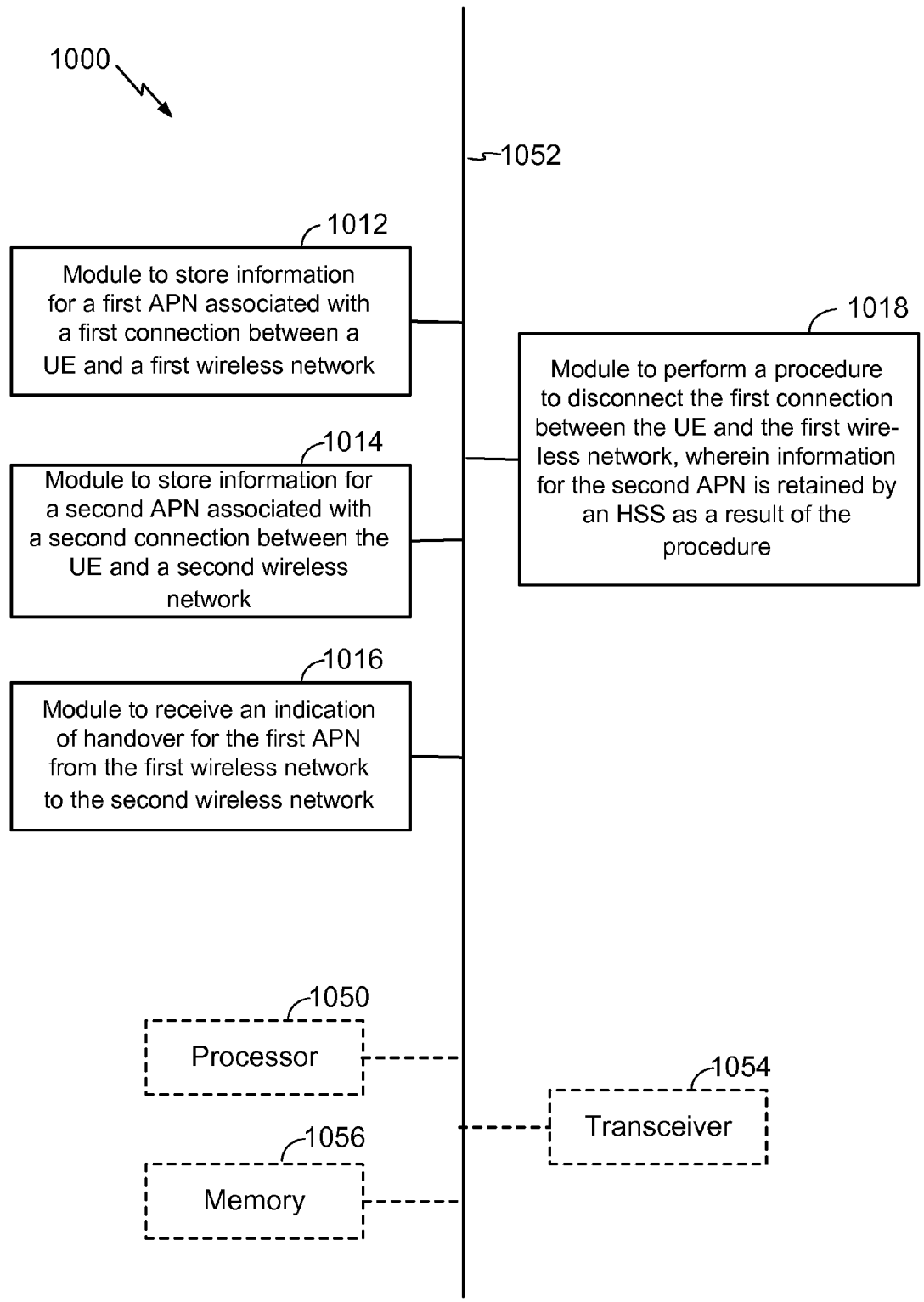
FIG. 10 shows an example apparatus for facilitating detachment of a UE from a wireless network, in accordance with the methodology of FIGS. 9A-B.

In accordance with one or more aspects of the embodiments described herein, FIG. 10 shows a design of an apparatus 1000 (e.g., a PDN gateway or component thereof) for detachment, as described above with reference to FIGS. 9A-B. For example, apparatus 1000 may include: a module 1012 to store information for a first APN associated with a first connection between a UE and a first wireless network; a module 1014 to store information for a second APN associated with a second connection between the UE and a second wireless network; a module 1016 to receive an indication of handover for the first APN from the first wireless network to the second wireless network; and a module 1018 to perform a procedure to disconnect the first connection between the UE and the first wireless network, wherein information for the second APN is retained by an HSS as a result of the procedure. For the sake of conciseness, the rest of the details regarding apparatus 1000 are not further elaborated on; however, it is to be understood that the remaining features and aspects of the apparatus 1000 are substantially similar to those described above with respect to apparatus 600 of FIG. 6.

Figure 11A:
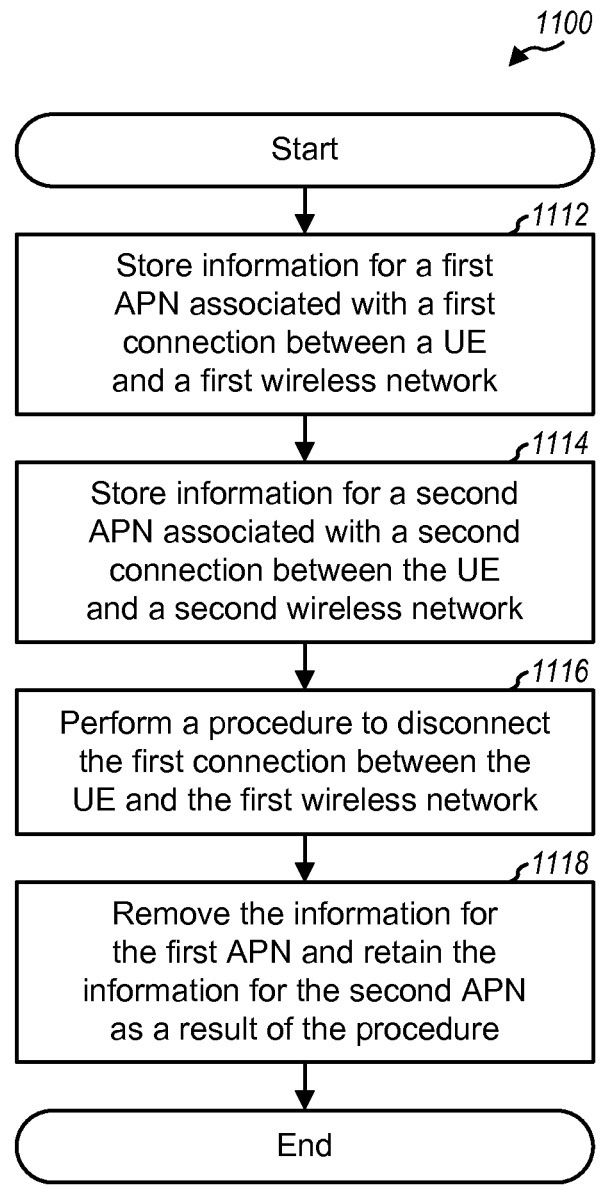
FIG. 11A illustrates an example detachment methodology executable by an HSS.

FIG. 11A shows a design of a method 1100 for supporting communication. Method 1100 may be performed by an HSS (as described below) or by some other entity. The HSS may store information for a first APN associated with a first connection between a UE and a first wireless network, e.g., a 3GPP network (block 1112). The HSS may also store information for a second APN associated with a second connection between the UE and a second wireless network, e.g., a WLAN (block 1114). The HSS may perform a procedure to disconnect the first connection between the UE and the first wireless network (block 1116). The procedure may comprise a PDN disconnection procedure, or a bearer deactivation procedure, or some other procedure. The HSS may remove the information for the first APN and may retain the information for the second APN as a result of the procedure (block 1118).

Figure 11B:
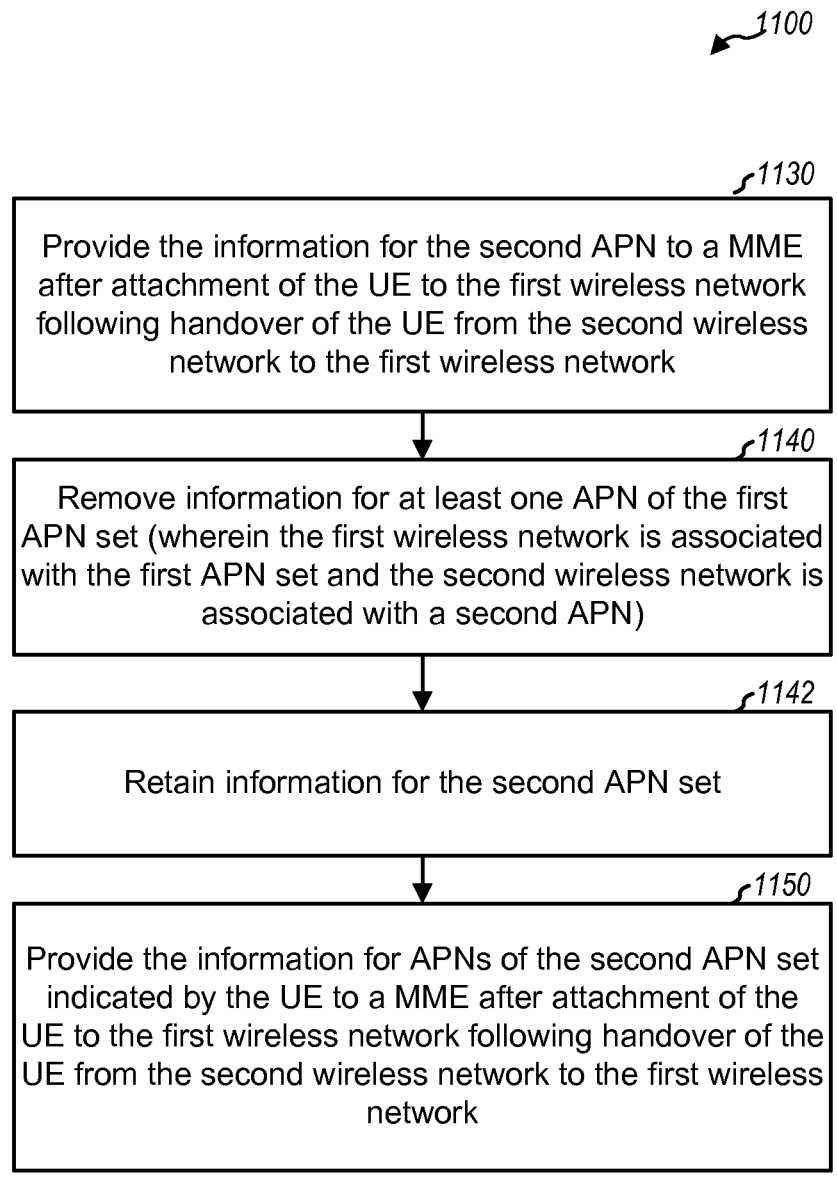
FIG. 11B illustrates further aspects of the methodology of FIG. 11A.

With reference to FIG. 11B, there are shown further operations or aspects of method 1100 that are optional and may be performed by an HSS or the like for detachment. For example, the method 1100 may involve providing the information for the second APN to an mme after attachment of the UE to the first wireless network following handover of the UE from the second wireless network to the first wireless network (block 1130). In related aspects, the first wireless network may be associated with a first set of APNs, the second wireless network may be associated with a second set of APNs, and the method 1100 may involve: removing comprises removing information for at least one APN of the first APN set (block 1140); and/or retaining comprises retaining information for the second APN set (block 1142). In further related aspects, the method 1100 may involve providing the information for APNs of the second APN set indicated by the UE to an mme after attachment of the UE to the first wireless network following handover of the UE from the second wireless network to the first wireless network (block 1150).

Figure 12:
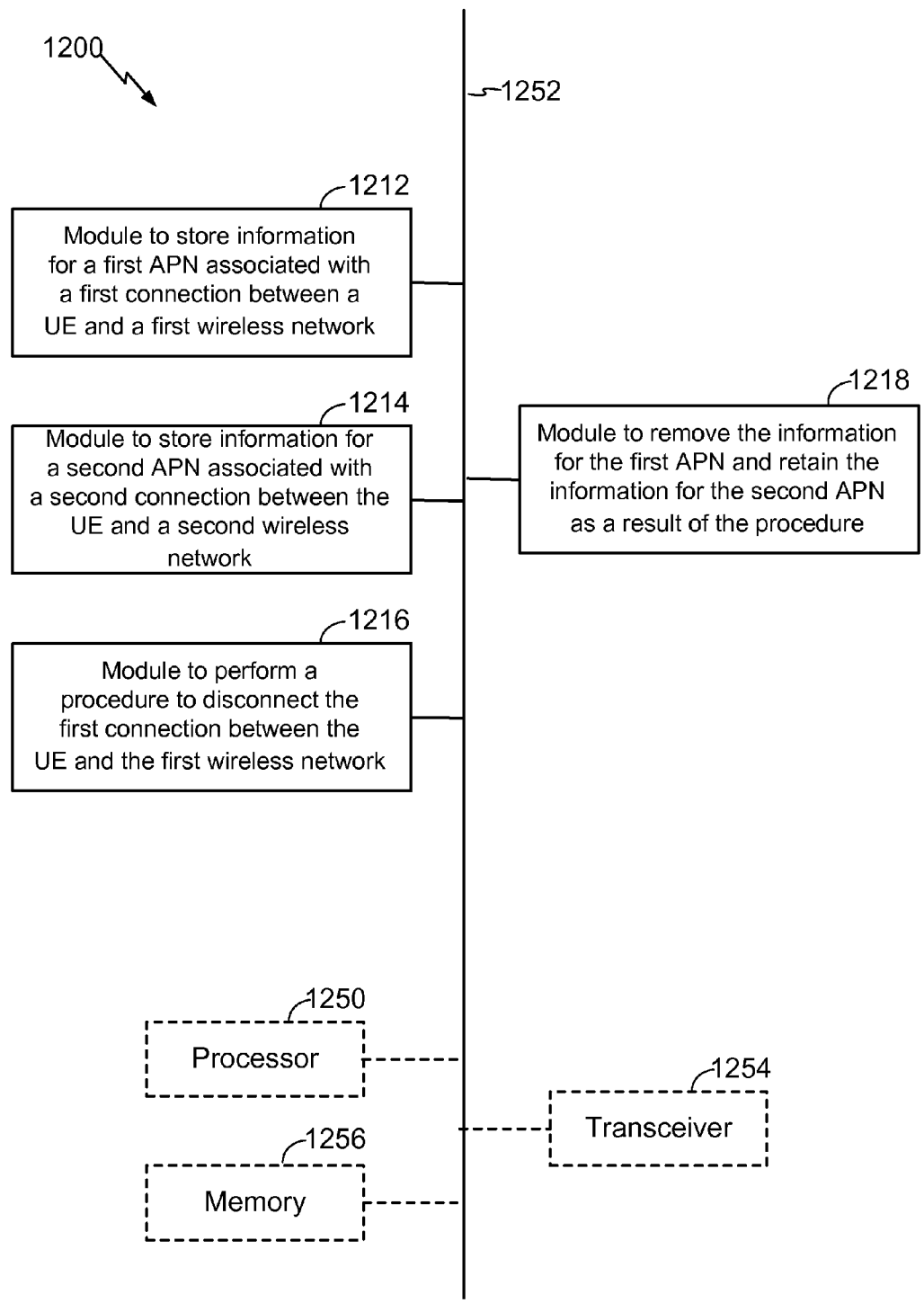
FIG. 12 shows an example apparatus for facilitating detachment of a UE from a wireless network, in accordance with the methodology of FIGS. 11A-B.

In accordance with one or more aspects of the embodiments described herein, FIG. 12 shows a design of an apparatus 1200 (e.g., an HSS or component thereof) for detachment, as described above with reference to FIGS. 11A-B. For example, apparatus 1200 may include: a module 1212 to store information for a first APN associated with a first connection between a UE and a first wireless network; a module 1214 to store information for a second APN associated with a second connection between the UE and a second wireless network; a module 1216 to perform a procedure to disconnect the first connection between the UE and the first wireless network; and a module 1218 to remove the information for the first APN and retain the information for the second APN as a result of the procedure. For the sake of conciseness, the rest of the details regarding apparatus 1200 are not further elaborated on; however, it is to be understood that the remaining features and aspects of the apparatus 1200 are substantially similar to those described above with respect to apparatus 600 of FIG. 6.

Figure 13:
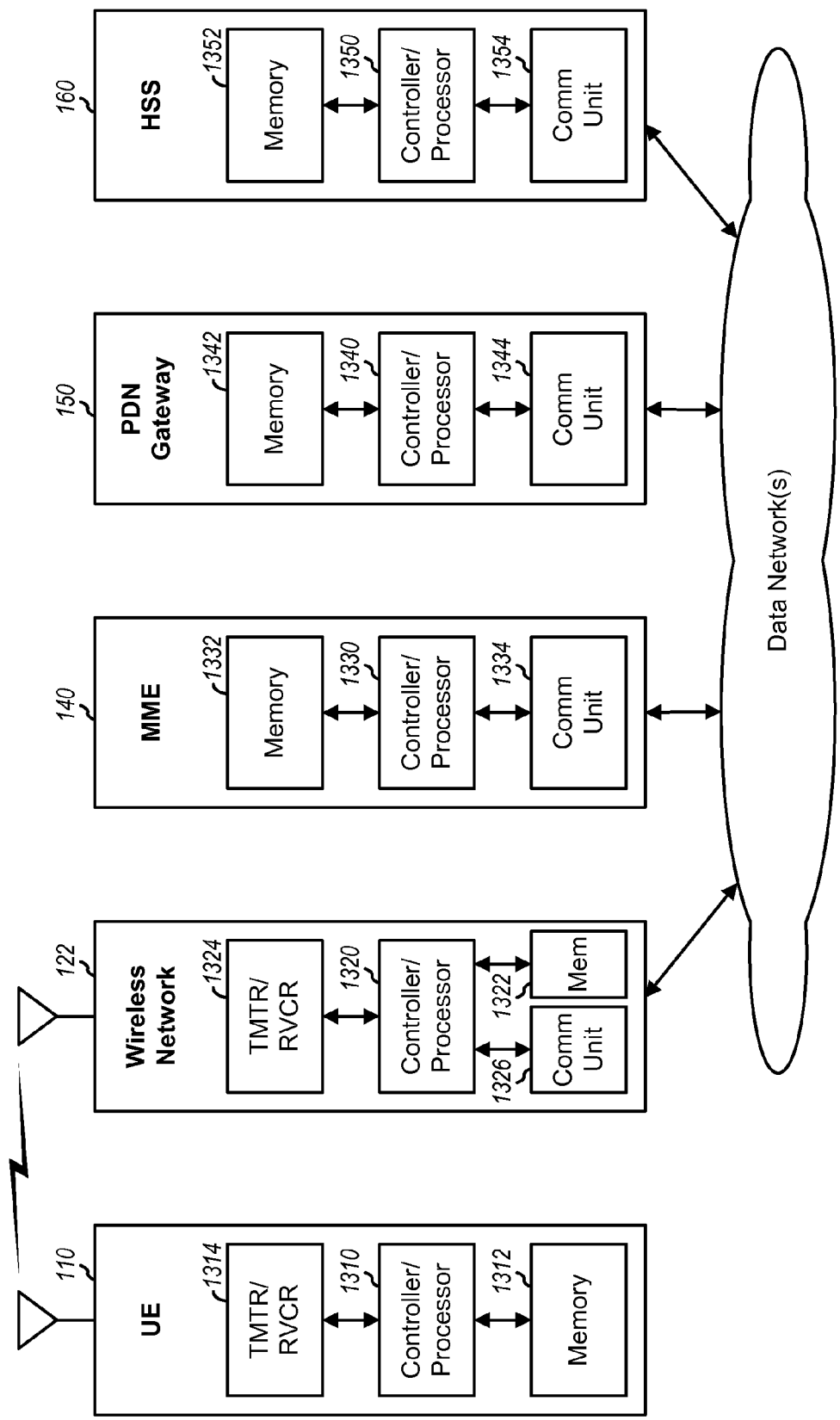
FIG. 13 is a block diagram showing example designs of a UE, a wireless network, an MME, a PDN gateway, and an HSS.

FIG. 13 shows a block diagram of a design of UE 110, a wireless network 122, MME 140, PDN gateway 150, and HSS 160. Wireless network 122 may be a 3GPP network, a WLAN, or some other wireless network. For simplicity, FIG. 13 shows (i) one controller/processor 1310, one memory 1312, and one transmitter/receiver (TMTR/RCVR) 1314 for UE 110, (ii) one controller/processor 1320, one memory (Mem) 1322, one transmitter/receiver 1324, and one communication (Comm) unit 1326 for wireless network 122, (iii) one controller/processor 1330, one memory 1332, and one communication unit 1334 for MME 140, (iv) one controller/processor 1340, one memory 1342, and one communication unit 1344 for PDN gateway 150, and (v) one controller/processor 1350, one memory 1352, and one communication unit 1354 for HSS 160. In general, each entity may include any number of controllers, processors, memories, transceivers, communication units, etc.

On the downlink, base stations in wireless network 122 may transmit traffic data and messages to UEs within their coverage areas. The traffic data and messages may be processed by processor 1320 and conditioned by transmitter 1324 to generate downlink signals, which may be transmitted to the UEs. At UE 110, the downlink signals from the base stations may be received and conditioned by receiver 1314 and further processed by processor 1310 to obtain traffic data and messages sent to UE 110. Memory 1312 may store program codes and data for UE 110. Processor 1310 may perform or direct process 500 in FIG. 5 and/or other processes for the techniques described herein. Processor 1310 may also perform the processing for UE 110 in message flow 400 in FIG. 4.

On the uplink, UE 110 may transmit traffic data and messages to base stations in wireless network 122. The traffic data and messages may be processed by processor 1310 and conditioned by transmitter 1314 to generate an uplink signal, which may be transmitted to the base stations. At wireless network 122, the uplink signals from UE 110 and other UEs may be received and conditioned by receiver 1324 and further processed by processor 1320 to obtain traffic data and messages sent by the UEs. Memory 1322 may store program codes and data for wireless network 122, which may communicate with other network entities via communication unit 1326.

Within MME 140, processor 1330 may perform processing for MME 140, memory 1332 may store program codes and data for MME 140, and communication unit 1334 may allow MME 140 to communicate with other entities. Processor 1330 may perform or direct process 700 in FIG. 7 and/or other processes for the techniques described herein. Processor 1330 may also perform the processing for MME 140 in message flow 400 in FIG. 4.

Within PDN gateway 150, processor 1340 may perform processing for PDN gateway 150, memory 1342 may store program codes and data for PDN gateway 150, and communication unit 1344 map allow PDN gateway 150 to communicate with other entities. Processor 1340 may perform or direct process 900 in FIG. 9 and/or other processes for the techniques described herein. Processor 1340 may also perform the processing for PDN gateway 150 in message flow 400 in FIG. 4.

Within HSS 160, processor 1350 may perform processing for HSS 160, memory 1352 may store program codes and data for HSS 160, and communication unit 1354 may allow HSS 160 to communicate with other entities. Processor 1350 may perform or direct process 1100 in FIG. 11 and/or other processes for the techniques described herein. Processor 1350 may also perform the processing for HSS 160 in message flow 400 in FIG. 4.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
    connecting to a first wireless network associated with a first access point name (APN);
    connecting to a second wireless network associated with a second APN;
    performing handover for the first APN from the first wireless network to the second wireless network; and
    performing detach for the first APN from the second wireless network,
    wherein information for the second APN is retained by a home subscriber server (HSS) after the handover for the first APN from the first wireless network to the second wireless network and also after the detach for the first APN from the second wireless network.

2. The method of claim 1, wherein the first wireless network comprises a 3GPP network and the second wireless network comprises a WLAN.

3. The method of claim 1, further comprising:
    receiving an indication to detach from the first wireless network, wherein the handover for the first APN from the first wireless network to the second wireless network and the detach for the first APN from the second wireless network are performed in response to the indication.

4. The method of claim 1, wherein the first wireless network is associated with at least one additional APN, the method further comprising:
    performing handover for the at least one additional APN from the first wireless network to the second wireless network; and
    performing detach for one or more of the at least one additional APN from the second wireless network.

5. The method of claim 1, wherein:
    the first wireless network is associated with a first set of APNs;
    performing the handover comprises performing the handover for the first APN set from the first wireless network to the second wireless network; and
    performing the detach comprises performing the detach for at least one APN of the first APN set from the second wireless network.

6. The method of claim 5, wherein the second wireless network is associated with a second set of APNs.

7. The method of claim 1, wherein information for the second APN is discarded by a home subscriber server (HSS) for detach for the first APN from the first wireless network.

8. The method of claim 1, further comprising:
    performing handover from the second wireless network to the first wireless network; and
    attaching to the first wireless network after handover to the first wireless network, wherein information for the second APN is retrieved from a home subscriber server (HSS) and used to support communication via the first wireless network.

9. The method of claim 1, wherein the connecting to the first wireless network, the connecting to the second wireless network, the performing handover, and the performing detach are performed by a user equipment (UE).

10. An apparatus for wireless communication, comprising:
    means for connecting to a first wireless network associated with a first access point name (APN);
    means for connecting to a second wireless network associated with a second APN;
    means for performing handover for the first APN from the first wireless network to the second wireless network; and
    means for performing detach for the first APN from the second wireless network,
    wherein information for the second APN is retained by a home subscriber server (HSS) after the handover for the first APN from the first wireless network to the second wireless network and also after the detach for the first APN from the second wireless network.

11. The apparatus of claim 10, wherein the first wireless network comprises a 3GPP network and the second wireless network comprises a WLAN.

12. The apparatus of claim 10, further comprising:
    means for receiving an indication to detach from the first wireless network, wherein the handover for the first APN from the first wireless network to the second wireless network and the detach for the first APN from the second wireless network are performed in response to the indication.

13. The apparatus of claim 10, wherein:
    the first wireless network is associated with at least one additional APN; and
    the apparatus further comprises:
        means for performing the handover for the at least one additional APN from the first wireless network to the second wireless network; and
        means for performing the detach for one or more of the at least one additional APN from the second wireless network.

14. The apparatus of claim 10, wherein:
    the first wireless network is associated with a first set of APNs; and
    the apparatus further comprises:
        means for performing the handover comprises performing the handover for the first APN set from the first wireless network to the second wireless network; and
        means for performing the detach comprises performing the detach for at least one APN of the first APN set from the second wireless network.

15. The apparatus of claim 14, wherein the second wireless network is associated with a second set of APNs.

16. The apparatus of claim 10, wherein information for the second APN is discarded by a home subscriber server (HSS) for detach for the first APN from the first wireless network.

17. The apparatus of claim 10, further comprising:
means for performing handover from the second wireless network to the first wireless network; and
means for attaching to the first wireless network after handover to the first wireless network, wherein information for the second APN is retrieved from a home subscriber server (HSS) and used to support communication via the first wireless network.

18. The apparatus of claim 10, wherein the apparatus comprises a user equipment (UE).

19. An apparatus for wireless communication, comprising:
at least one processor configured to: connect to a first wireless network associated with a first access point name (APN); connect to a second wireless network associated with a second APN; perform handover for the first APN from the first wireless network to the second wireless network; and perform detach for the first APN from the second wireless network; and
a memory coupled to the at least one processor for storing data,
wherein information for the second APN is retained by a home subscriber server (HSS) after the handover for the first APN from the first wireless network to the second wireless network and also after the detach for the first APN from the second wireless network.

20. The apparatus of claim 19, wherein the first wireless network comprises a 3GPP network and the second wireless network comprises a WLAN.

21. The apparatus of claim 19, wherein:
the at least one processor is configured to receive an indication to detach from the first wireless network; and
the handover for the first APN from the first wireless network to the second wireless network and the detach for the first APN from the second wireless network are performed in response to the indication.

22. The apparatus of claim 19, wherein:
the first wireless network is associated with at least one additional APN; and
the at least one processor is configured to:
perform the handover for the at least one additional APN from the first wireless network to the second wireless network; and
perform the detach for one or more of the at least one additional APN from the second wireless network.

23. The apparatus of claim 19, wherein:
the first wireless network is associated with a first set of APNs; and
the at least one processor is configured to:
perform the handover comprises performing the handover for the first APN set from the first wireless network to the second wireless network; and
perform the detach comprises performing the detach for at least one APN of the first APN set from the second wireless network.

24. The apparatus of claim 23, wherein the second wireless network is associated with a second set of APNs.

25. The apparatus of claim 19, wherein information for the second APN is discarded by a home subscriber server (HSS) for detach for the first APN from the first wireless network.

26. The apparatus of claim 19, wherein the at least one processor is configured to:
perform handover from the second wireless network to the first wireless network; and
attach to the first wireless network after handover to the first wireless network, wherein information for the second APN is retrieved from a home subscriber server (HSS) and used to support communication via the first wireless network.

27. The apparatus of claim 19, wherein the apparatus comprises a user equipment (UE).

28. A computer program product, comprising:
a non-transitory computer-readable medium comprising:
code for causing at least one computer to connect to a first wireless network associated with a first access point name (APN);
code for causing the at least one computer to connect to a second wireless network associated with a second APN;
code for causing the at least one computer to perform handover for the first APN from the first wireless network to the second wireless network; and
code for causing the at least one computer to perform detach for the first APN from the second wireless network,
wherein information for the second APN is retained by a home subscriber server (HSS) after the handover for the first APN from the first wireless network to the second wireless network and also after the detach for the first APN from the second wireless network.

29. The computer program product of claim 28, wherein the first wireless network comprises a 3GPP network and the second wireless network comprises a WLAN.

30. The computer program product of claim 28, wherein:
the computer-readable medium comprises code for causing the at least one computer to receive an indication to detach from the first wireless network; and
the handover for the first APN from the first wireless network to the second wireless network and the detach for the first APN from the second wireless network are performed in response to the indication.

31. The computer program product of claim 28, wherein:
the first wireless network is associated with at least one additional APN; and
the computer-readable medium comprises code for causing the at least one computer to:
perform the handover for the at least one additional APN from the first wireless network to the second wireless network; and
perform the detach for one or more of the at least one additional APN from the second wireless network.

32. The computer program product of claim 28, wherein:
the first wireless network is associated with a first set of APNs; and
the computer-readable medium comprises code for causing the at least one computer to:
perform the handover comprises performing the handover for the first APN set from the first wireless network to the second wireless network; and
perform the detach comprises performing the detach for at least one APN of the first APN set from the second wireless network.

33. The computer program product of claim 32, wherein the second wireless network is associated with a second set of APNs.

34. The computer program product of claim 28, wherein information for the second APN is discarded by a home subscriber server (HSS) for detach for the first APN from the first wireless network.

35. The computer program product of claim 28, wherein the computer-readable medium comprises code for causing the at least one computer to:

perform handover from the second wireless network to the first wireless network; and attach to the first wireless network after handover to the first wireless network, wherein information for the second APN is retrieved from a home subscriber server (HSS) and used to support communication via the first wireless network.

36. The computer program product of claim 28, wherein the at least one computer comprises at least one user equipment (UE).

* * * * *